(12) United States Patent
Wang et al.

(10) Patent No.: US 11,997,736 B2
(45) Date of Patent: May 28, 2024

(54) CONNECTION ESTABLISHMENT METHOD AND TERMINAL DEVICE

(71) Applicants: Huawei Technologies Co., Ltd., Shenzhen (CN); Peking University, Beijing (CN)

(72) Inventors: Hao Wang, Shanghai (CN); Songping Yao, Beijing (CN); Chenren Xu, Beijing (CN); Fanzhao Wang, Shenzhen (CN); Xingmin Guo, Shanghai (CN); Xiangli Li, Shenzhen (CN); Zhiyu Chen, Munich (DE)

(73) Assignees: Huawei Technologies Co., Ltd., Shenzhen (CN); Peking University, Beijing (CN)

( * ) Notice: Subject to any disclaimer, the term of this patent is extended or adjusted under 35 U.S.C. 154(b) by 392 days.

(21) Appl. No.: 17/418,689

(22) PCT Filed: Nov. 30, 2019

(86) PCT No.: PCT/CN2019/122230
§ 371 (c)(1),
(2) Date: Jun. 25, 2021

(87) PCT Pub. No.: WO2020/134868
PCT Pub. Date: Jul. 2, 2020

(65) Prior Publication Data
US 2022/0094748 A1 Mar. 24, 2022

(30) Foreign Application Priority Data
Dec. 25, 2018 (CN) .......................... 201811593656.3

(51) Int. Cl.
*H04L 69/14* (2022.01)
*H04L 43/0852* (2022.01)
(Continued)

(52) U.S. Cl.
CPC ......... *H04W 76/16* (2018.02); *H04L 43/0852* (2013.01); *H04L 69/14* (2013.01);
(Continued)

(58) Field of Classification Search
CPC ..... H04W 76/16; H04W 80/06; H04W 84/12; H04W 88/06
See application file for complete search history.

(56) References Cited

U.S. PATENT DOCUMENTS 10,644,988 B2 * 5/2020 Tanaka .................. H04L 45/124
2014/0153583 A1 * 6/2014 Gouache ............... H04L 67/141
370/437

(Continued)

FOREIGN PATENT DOCUMENTS

CN 103856934 A 6/2014
CN 103905463 A 7/2014
(Continued)

OTHER PUBLICATIONS

"3rd Generation Partnership Project; Technical Specification Group Services and System Aspects; Study on access traffic steering, switch and splitting support in the 5G system architecture (Release 16)," 3GPP TR 23.793 V16.0.0, total 114 pages, 3rd Generation Partnership Project, Valbonne, France (Dec. 2018).
(Continued)

*Primary Examiner* — Amal S Zenati
(74) *Attorney, Agent, or Firm* — Leydig, Voit & Mayer, Ltd.

(57) ABSTRACT

A connection establishment method includes a terminal device obtaining historical data of a multipath transmission control protocol (MPTCP) connection established between the terminal device and an application server. The historical data includes a data transmission delay of a transmission control protocol (TCP) connection corresponding to a Wi-Fi
(Continued)

network and a data transmission delay of a TCP connection corresponding to a cellular network. The terminal device determines, based on the historical data, that the data transmission delay of the TCP connection corresponding to the cellular network is less than or equal to the data transmission delay of the TCP connection corresponding to the Wi-Fi network, and establishes a first TCP connection to the application server through an interface of the cellular network; and after the first TCP connection is successfully established, the terminal device establishes a second TCP connection to the application server through an interface of the Wi-Fi network.

18 Claims, 8 Drawing Sheets

(51) Int. Cl.
*H04W 76/16* (2018.01)
*H04W 88/06* (2009.01)
*H04W 80/06* (2009.01)
*H04W 84/12* (2009.01)

(52) U.S. Cl.
CPC ............ *H04W 80/06* (2013.01); *H04W 84/12* (2013.01); *H04W 88/06* (2013.01)

(56) References Cited

U.S. PATENT DOCUMENTS

| | | |
|---|---|---|
| 2014/0362765 A1 | 12/2014 | Biswas et al. |
| 2015/0215345 A1 | 7/2015 | Agarwal |
| 2016/0212759 A1 | 7/2016 | Schliwa-Bertling et al. |
| 2016/0373533 A1 | 12/2016 | Biswas et al. |
| 2018/0352057 A1 | 12/2018 | Li |

FOREIGN PATENT DOCUMENTS

| | | |
|---|---|---|
| CN | 104243443 A | 12/2014 |
| CN | 104702527 A | 6/2015 |
| CN | 104994036 A | 10/2015 |
| CN | 105656875 A | 6/2016 |
| CN | 105873097 A | 8/2016 |
| CN | 105900390 A | 8/2016 |
| CN | 107071834 A | 8/2017 |
| CN | 108696449 A | 10/2018 |
| CN | 107113285 B | 9/2020 |
| JP | 2018170699 A | 11/2018 |
| KR | 101914391 B1 | 11/2018 |
| WO | 2010044366 A1 | 4/2010 |

OTHER PUBLICATIONS

Jin-Young, "Statistical concepts," Tistory Blog, https://snowall.tistory.com/3309, Total 8 pages (Mar. 24, 2013). With an English translation.
Danaeno, "What is a weighted average?," Naver Blog, https://m.blog.naver.com/gggg0714/221014608547, Total 8 pages (May 26, 2017). With an English translation.
Kaiping et al., "Survey of MPTCP-Based Multipath Transmission Optimization," Journal of Computer Research and Development, issn1000-1239.2016.20150589, total 18 pages (Jun. 2015). With English Abstract.
Bagnulo et al., "Analysis of MPTCP residual threats and possible fixes, draft-bagnulo-mptcp-attacks-01," Network Working Group, total 25 pages (Oct. 1, 2013).
"Series H: Audiovisual and Multimedia Systems, Infrastructure of audiovisual services—Coding of moving video, Advanced video coding for generic audiovisual services," ITU-T H.264 (Apr. 2017), total 812 pages, International Telecommunication Union, Geneva, Switzerland (Apr. 2017).
Bonaventure et al., "Experience with Multipath TCP, draft-bonaventure-mptcp-experience-00," MPTCP Working Group, total 19 pages (Jul. 1, 2014).
Wu et al., "Predictable Multipath TCP (MPTCP) extension, draft-qian-mptcp-predict-01," Internet Engineering Task Force, total 9 pages (Sep. 13, 2021).
"MultiPath TCP—Linux Kernel implementation," Main—Home Page browse, URL:https://www.multipath-tcp.org/, total 2 pages (Sep. 2012).
M. Bagnulo et al., "Threat Analysis for TCP Extensions for Multipath Operation with Multiple Addresses," Internet Engineering Task Force (IETF), Request for Comments: 6181, total 17 pages (Mar. 2011).
A. Ford et al., "Architectural Guidelines for Multipath TCP Development," Internet Engineering Task Force (IETF), Request for Comments: 6182, total 28 pages (Mar. 2011).
C. Raiciu et al., "Coupled Congestion Control for Multipath Transport Protocols," Internet Engineering Task Force (IETF), Request for Comments: 6356, total 12 pages (Oct. 2011).
M. Scharf et al., "Multipath TCP (MPTCP) Application Interface Considerations," Internet Engineering Task Force (IETF), Request for Comments: 6897, total 31 pages (Mar. 2013).
M. Bagnulo et al., "Analysis of Residual Threats and Possible Fixes for Multipath TCP (MPTCP)," Internet Engineering Task Force (IETF), Request for Comments: 7430, total 19 pages (Jul. 2015).
O. Bonaventure et al., "Use Cases and Operational Experience with Multipath TCP," Internet Engineering Task Force (IETF), Request for Comments: 8041, total 30 pages (Jan. 2017).
A. Ford et al., "RFC 8684, TCP Extensions for Multipath Operation with Multiple Addresses," Internet Engineering Task Force (IETF), total 68 pages (Mar. 2020).
"Definition and conclusion of ATSSS function," 3GPP TSG-SA WG2 Meeting #129, Dongguan, China, S2-1811578 (Revision of S2-1810983), Total 8 pages, 3rd Generation Partnership Project, Valbonne, France (Oct. 15-19, 2018).

* cited by examiner

CONNECTION ESTABLISHMENT METHOD AND TERMINAL DEVICE

CROSS-REFERENCE TO RELATED APPLICATIONS

This application is a National Stage of International Application No. PCT/CN2019/122230 filed on Nov. 30, 2019, which claims priority to Chinese Patent Application No. 201811593656.3, filed on Dec. 25, 2018. Both of the aforementioned applications are hereby incorporated by reference in their entireties.

TECHNICAL FIELD

This application relates to the field of terminal technologies, and in particular, to a connection establishment method and a terminal device.

BACKGROUND

A multipath transmission control protocol (MPTCP) is an extension of a transmission control protocol (TCP), and uses parallel transmission of a plurality of TCP connections, to improve resource utilization and enhance a connection failure recovery capability. For example, when a user watches a video, a mobile phone transmits data streams simultaneously through TCP connections separately corresponding to a Wi-Fi network and a cellular network. In this way, a larger aggregated bandwidth can be provided, a download rate is higher, frame freezing is reduced, and playing is smoother.

Currently, an MPTCP establishment method is to first establish the first TCP connection in the Wi-Fi network, and then establish the second TCP connection in the cellular network after the first TCP connection is successfully established. However, if a data transmission delay of the first TCP connection is very large, the second TCP connection can be established only after a relatively long time period; or if the first TCP connection cannot be successfully established, the second TCP connection cannot be successfully established either.

SUMMARY

This application provides a connection establishment method and a terminal device, to resolve a problem of a large data transmission delay of the first TCP connection in an existing MPTCP.

According to a first aspect, an embodiment of this application provides a connection establishment method, and the method is applicable to a terminal device. The method includes: The terminal device first obtains historical data of an MPTCP connection established between the terminal device and an application server. Because the historical data includes a data transmission delay of a TCP connection corresponding to a Wi-Fi network and a data transmission delay of a TCP connection corresponding to a cellular network, the terminal device determines, based on the historical data, that the data transmission delay of the TCP connection corresponding to the cellular network is less than or equal to the data transmission delay of the TCP connection corresponding to the Wi-Fi network, and establishes the first TCP connection to the application server through an interface of the cellular network; and after the first TCP connection is successfully established, the terminal device establishes the second TCP connection to the application server through an interface of the Wi-Fi network.

In a possible design, when determining, based on the historical data, that the data transmission delay of the TCP connection corresponding to the cellular network is greater than the data transmission delay of the TCP connection corresponding to the Wi-Fi network, the terminal device establishes the first TCP connection to the application server through the interface of the Wi-Fi network; and after the first TCP connection is successfully established, the terminal device establishes the second TCP connection to the application server through the interface of the cellular network.

In this embodiment of this application, the terminal device first establishes the first TCP connection through an interface of a network with a relatively small data transmission delay, so that duration consumed for establishing the first TCP connection in the MPTCP connection can be reduced, thereby helping reduce a playing start delay and improve user experience.

In a possible design, after obtaining the historical data of the MPTCP connection established between the terminal device and the application server, the terminal device calculates, according to Formula 1 to Formula 3, a first average value and a standard deviation of the data transmission delay of the TCP connection corresponding to the Wi-Fi network, and a second average value of the data transmission delay of the TCP connection corresponding to the cellular network. If $\mu2 \leq \mu1+2\times\sigma$, the terminal device determines that the data transmission delay of the TCP connection corresponding to the cellular network is less than or equal to the data transmission delay of the TCP connection corresponding to the Wi-Fi network; or if $\mu2 > \mu1+2\times\sigma$, the terminal device determines that the data transmission delay of the TCP connection corresponding to the cellular network is greater than the data transmission delay of the TCP connection corresponding to the Wi-Fi network.

$$\mu1 = \frac{x_1 + x_2 + x_3 + \ldots + x_i + \ldots + x_N}{N}; \quad \text{(Formula 1)}$$

$$\sigma = \sqrt{\frac{1}{N}\sum_{i=1}^{N}(x_i - \mu1)^2}; \text{ and} \quad \text{(Formula 2)}$$

$$\mu2 = \frac{y_1 + y_2 + y_3 + \ldots + y_i + \ldots + y_M}{M}, \quad \text{(Formula 3)}$$

where $\mu1$ is the first average value, $\mu2$ is the second average value, $\sigma$ is the standard deviation, $x_1$ to $x_N$ are data transmission delays of the TCP connection corresponding to the Wi-Fi network, N is a quantity of data transmission delays of the TCP connection corresponding to the Wi-Fi network, $y_1$ to $y_M$ are data transmission delays of the TCP connection corresponding to the cellular network, and M is a quantity of data transmission delays of the TCP connection corresponding to the cellular network.

In this embodiment of this application, the terminal device may accurately obtain, through calculation, a target network with a TCP connection having a relatively small data transmission delay, and then establish the first TCP connection through an interface of the network with the relatively small data transmission delay.

In another possible design, the terminal device may further calculate, according to Formula 4, a second weighted average value $\mu2'$ of the data transmission delay of the TCP connection corresponding to the cellular network. If $\mu2' \leq \mu1+2\times\sigma$, the terminal device determines that the data transmission delay of the TCP connection corresponding to the cellular network is less than or equal to the data transmission delay of the TCP connection corresponding to the Wi-Fi network; or if µ2'>µ1+2×σ, the terminal device determines that the data transmission delay of the TCP connection corresponding to the cellular network is greater than the data transmission delay of the TCP connection corresponding to the Wi-Fi network.

$$\mu2' = \frac{y_1 \times \omega_1 + y_2 \times \omega_{12} + y_3 \times \omega_3 + \ldots + y_i \times \omega_i + \ldots + y_M \times \omega_M}{M}, \quad \text{(Formula 4)}$$

where $y_1$ to $y_M$ are data transmission delays of the TCP connection corresponding to the cellular network, M is a quantity of data transmission delays of the TCP connection corresponding to the cellular network, $\omega_1$ to $\omega_M$ are weight values of the data transmission delays of the TCP connection corresponding to the cellular network, and µ2' is the second weighted average value.

In this embodiment of this application, the terminal device may accurately obtain, through calculation in another manner, a target network with a TCP connection having a relatively small data transmission delay, and then establish the first TCP connection through an interface of the network with the relatively small data transmission delay.

In a possible design, if the historical data further includes an identifier of an application, an identifier of the cellular network, and an identifier of the Wi-Fi network, the terminal device may first determine, from the historical data, a data transmission delay set of a target TCP connection whose identifier is the same as that of an application corresponding to the application server, then determine, from the data transmission delay set of the target TCP connection based on the identifier of the cellular network, a first data transmission delay whose identifier is the same as that of a current cellular network; the terminal device determines, from the data transmission delay set of the target TCP connection based on the identifier of the Wi-Fi network, a second data transmission delay whose identifier is the same as that of a current Wi-Fi network; and finally, the terminal device determines, based on the first data transmission delay and the second data transmission delay, that the data transmission delay of the TCP connection corresponding to the cellular network is less than or equal to the data transmission delay of the TCP connection corresponding to the Wi-Fi network.

In this embodiment of this application, the terminal device filters data in the historical data, and selects data with a same application identifier and a same access point, so as to accurately determine a network with a relatively small data transmission delay.

In a possible design, the terminal device calculates a second weighted average value of the second data transmission delay, where a weight of a second data transmission delay of a TCP connection with an earlier establishment time is lower. When a sum of the first average value and two standard deviations is less than or equal to the second average value, and the sum of the first average value and the two standard deviations is less than or equal to the second weighted average value, the terminal device determines the Wi-Fi network as a target network; otherwise, determines the cellular network as a target network.

In a possible design, the terminal device determines, from the historical data, that the first data transmission delay and the second data transmission delay do not exist.

When both the interface of the Wi-Fi network and the interface of the cellular network are available, the terminal device determines that the cellular network is a Long Term Evolution (LTE) network. When a received signal strength indicator (RSSI) of the LTE network is greater than a set value, the terminal device determines that the target network is the LTE network; otherwise, determines that the target network is the Wi-Fi network.

In a possible design, the terminal device stores the data transmission delays of the two currently established TCP connections. In this way, the target network can be calculated at a subsequent moment.

In a possible design, a packet is sent to a base station in a cellular network accessed by the terminal device, where the packet is used to activate the cellular network of the terminal device. In this way, the data transmission delay can be reduced by about 200 ms.

According to a second aspect, an embodiment of this application provides a terminal device, including a processor and a memory. The memory is configured to store one or more computer programs. When the one or more computer programs stored in the memory are executed by the processor, the terminal device can implement the method in any possible design in any one of the foregoing aspects.

According to a third aspect, an embodiment of this application further provides an apparatus. The apparatus includes modules/units for performing the method in any possible design in any one of the foregoing aspects. These modules/units may be implemented by hardware, or may be implemented by hardware by executing corresponding software.

According to a fourth aspect, an embodiment of this application further provides a computer-readable storage medium. The computer-readable storage medium includes a computer program. When the computer program is run on a terminal device, the terminal device is enabled to perform the method in any possible design in any one of the foregoing aspects.

According to a fifth aspect, an embodiment of this application further provides a computer program product. When the computer program product runs on a terminal, the terminal device is enabled to perform the method in any possible design in any one of the foregoing aspects.

These aspects or other aspects of this application are clearer and easier to understand in descriptions of the following embodiments.

DESCRIPTION OF EMBODIMENTS

The following describes technical solutions in embodiments of this application with reference to the accompanying drawings. In the descriptions of embodiments of this application, the terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise stated, "a plurality of" means two or more.

Figure 1:
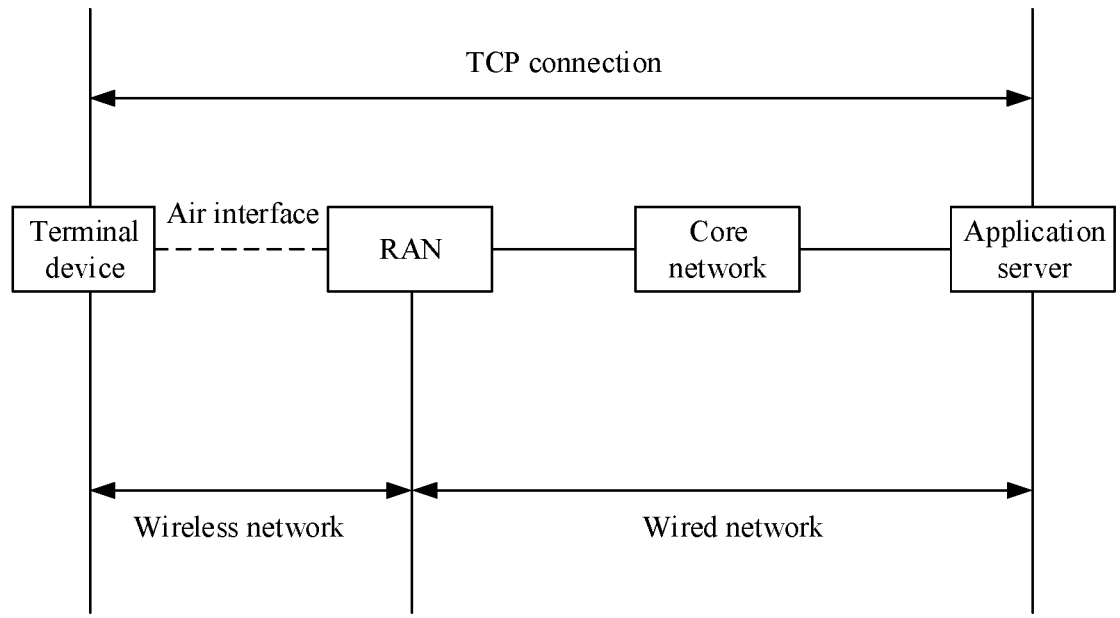
FIG. 1 is a system architecture of an MPTCP application according to an embodiment of this application.

The connection establishment method provided in embodiments of this application may be applied to data transmission in a wireless communications system. A data receive end exchanges data with a data transmit end by using a radio access network (RAN) and a core network, a transmission control protocol (TCP) connection may be further established between the data receive end and the data transmit end, and data is transmitted by using a TCP protocol. As shown in FIG. 1, in a wireless communications system, a terminal device exchanges data with an application server. The terminal device is connected to a RAN through an air interface, and is connected to the application server via a core network. A network between the terminal and the RAN may be referred to as a wireless network, and a network between the RAN and the application server may be referred to as a wired network. A TCP connection is established and data transmission is performed between the application server and the terminal.

The application server may be a server in a server cluster. For example, different video segments of a video application may be distributed on different servers. The application server may also be a server.

As communications technologies develop, a communications system has evolved to a communications architecture in which a plurality of communications networks are deployed together. A terminal may access more than one communications network for communication. It should be noted that, when the communications network is a local area network, for example, the communications network may be a near field communications network such as a Wireless Fidelity (Wi-Fi) network, a Bluetooth network, a ZigBee network, or a near field communication (NFC) network. When the communications network is a wide area network, for example, the communications network may be a third generation mobile communication technology (3rd-generation wireless telephone technology, 3G) network, a fourth generation mobile communication technology (4th generation mobile communication technology, 4G) network, a fifth generation mobile communication technology (5th-generation mobile communication technology, 5G) network, a future evolved public land mobile network (PLMN), or the Internet.

Figure 2:
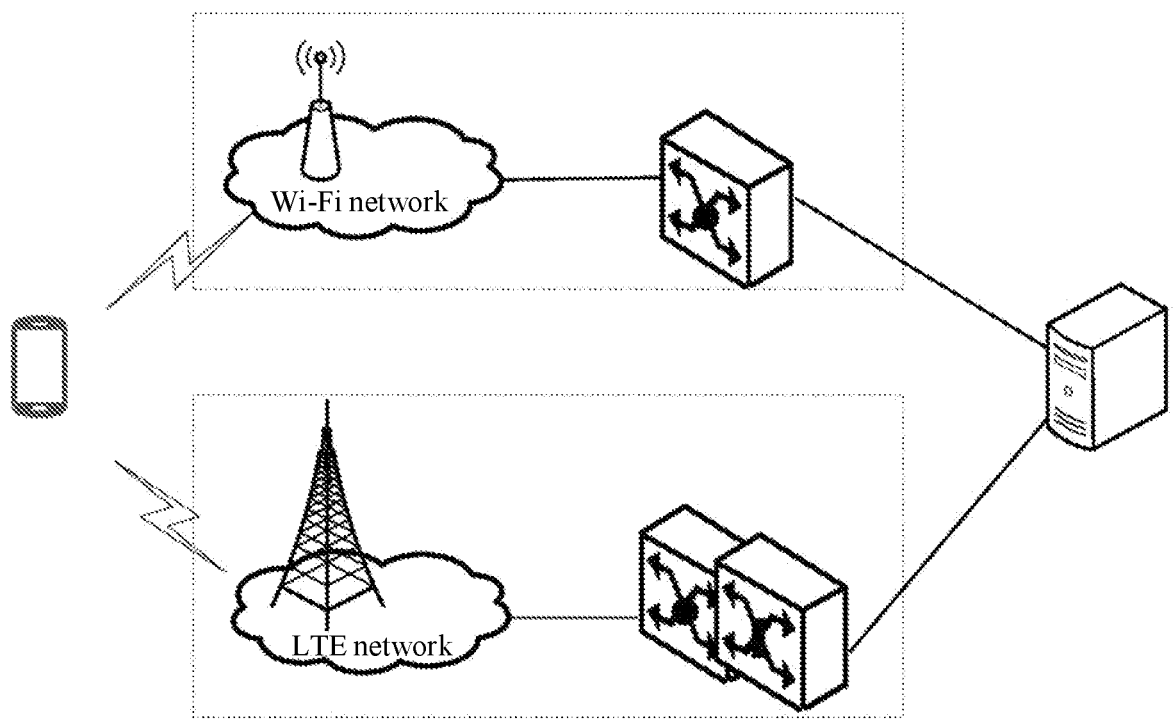
FIG. 2 is an architectural diagram of a data transmission system in multi-network deployment according to an embodiment of this application.

For example, in a communications system in which a Wi-Fi network and a Long Term Evolution (LTE) network are deployed in FIG. 2, a terminal may access the Wi-Fi network, and perform data transmission with an application server by using an evolved packet data gateway (ePDG) or a trusted gateway (TGW); or may access the LTE network, and perform data transmission with an application server by using a serving gateway (SGW) or a packet data gateway (Packet Data Network Gateway, PGW).

Figure 3:
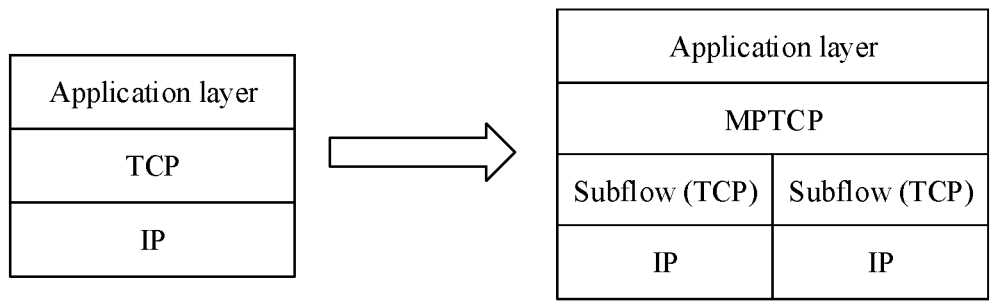
FIG. 3 is a schematic diagram of extending a TCP protocol stack to an MPTCP protocol stack according to an embodiment of this application.

Deployment of a heterogeneous network promotes development of a multipath data transmission service. Currently, an MPTCP protocol is obtained by extending a TCP protocol, and the MPTCP protocol is used to enable a service to use a multipath network resource to perform data transmission. For example, in FIG. 2, a mobile phone performs data transmission with the application server by using a Wi-Fi network resource and an LTE network resource. FIG. 3 is a schematic diagram of expanding a TCP protocol stack to an MPTCP protocol stack. In the TCP protocol stack, a data stream at an application layer is sent by using one TCP connection. In the MPTCP protocol stack, a transport layer is divided into two sublayers: an MPTCP layer and a TCP layer, and a data stream at an application layer is transmitted by using two TCP connections decomposed by the MPTCP layer.

Figure 4:
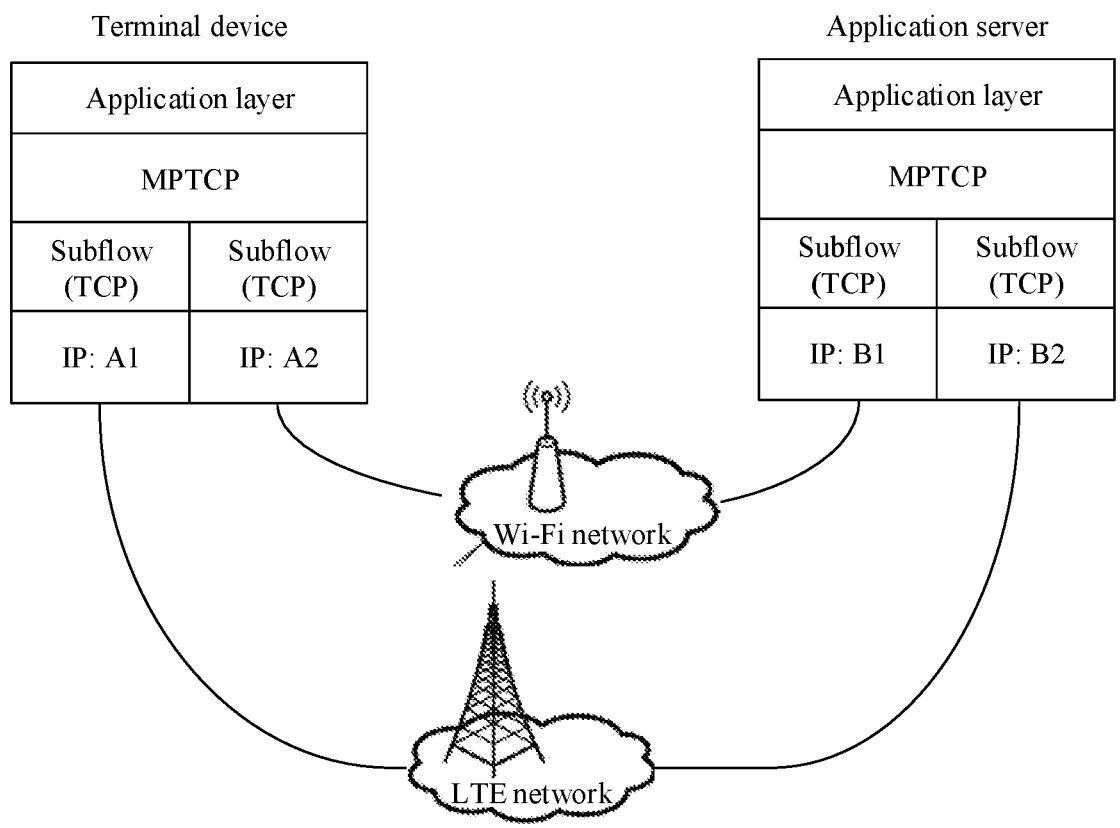
FIG. 4 is a schematic diagram of an MPTCP implementation process according to an embodiment of this application.

FIG. 4 is a schematic diagram of a usage scenario of an MPTCP. In FIG. 4, two TCP connections are established between a terminal device and an application server. One TCP connection uses a Wi-Fi network resource, and the other TCP connection uses an LTE network resource. An MPTCP layer of the application server divides a TCP flow into two TCP subflows, and then separately sends the two TCP subflows to the terminal device by using the two TCP connections. After receiving the two TCP subflows, the terminal device combines the two subflows and then sends the two subflows to an application layer.

In some embodiments of this application, the terminal device in the wireless communications system shown in FIG. 1 may be a portable terminal device that further includes another function such as a personal digital assistant function and/or a music player function, for example, a mobile phone, a tablet computer, or a wearable device (such as a smartwatch) having a wireless communication function. An example embodiment of the portable terminal device includes but is not limited to a portable terminal device using iOS®, Android®, Microsoft®, or another operating system. Alternatively, the portable terminal device may be another portable terminal device, for example, a laptop computer with a touch-sensitive surface (for example, a touch panel). It should be further understood that in some other embodiments of this application, the terminal device may alternatively be a desktop computer with a touch-sensitive surface (for example, a touch panel), but not a portable terminal device.

Figure 5:
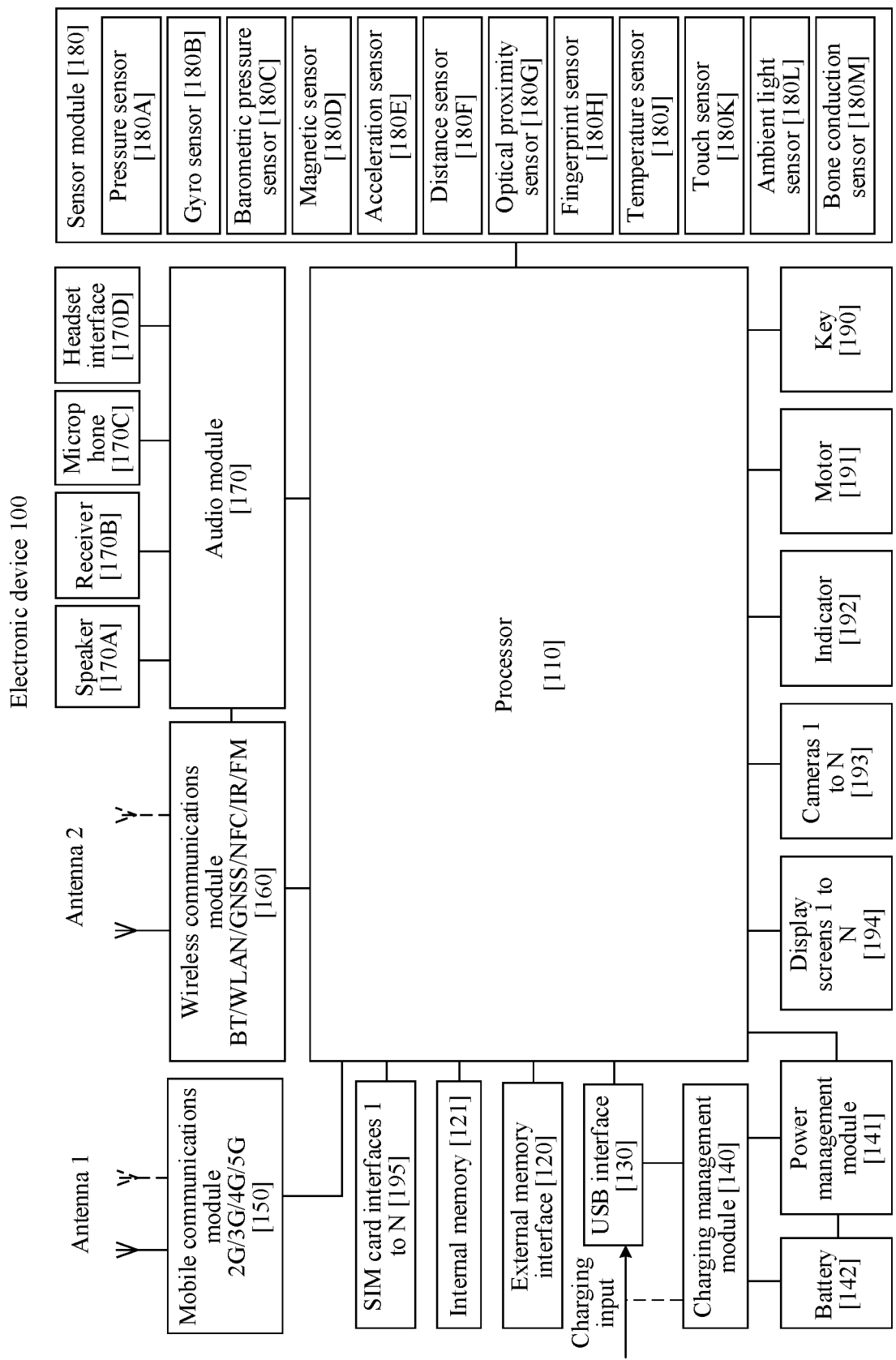
FIG. 5 is a schematic structural diagram of a terminal device according to an embodiment of this application.

For example, as shown in FIG. 5, the terminal device in this embodiment of this application may be a mobile phone. The following uses the mobile phone as an example to describe this embodiment in detail.

The mobile phone may include a processor 110, an external memory interface 120, an internal memory 121, a Universal Serial Bus (USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset interface 170D, a sensor module 180, a key 190, a motor 191, an indicator 192, a camera 193, a display screen 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the mobile phone. In some other embodiments of this application, the mobile phone may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural network processing unit (NPU). Different processing units may be independent components, or may be integrated into one or more processors.

The controller may be a nerve center and a command center of the mobile phone. The controller may generate an operation control signal based on instruction operation code and a time sequence signal, to complete control of instruction reading and instruction execution.

A memory may be further disposed in the processor 110, and is configured to store an instruction and data. In some embodiments, the memory in the processor 110 is a high-speed cache memory. The memory may store an instruction or data just used or cyclically used by the processor 110. If the processor 110 needs to use the instruction or the data again, the processor 110 may directly invoke the instruction or the data from the memory. This avoids repeated access and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a Universal Serial Bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile phone.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transmit the audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the Bluetooth headset.

The MIPI interface may be configured to connect the processor 110 to a peripheral component such as the display screen 194 or the camera 193. The MIPI interface includes a camera serial interface (CSI), a display serial interface (DSI), and the like. In some embodiments, the processor 110 communicates with the camera 193 through the CSI interface, to implement a photographing function of the mobile phone. The processor 110 communicates with the display screen 194 through the DSI interface, to implement a display function of the mobile phone.

The GPIO interface may be configured through software. The GPIO interface may be configured as a control signal or a data signal. In some embodiments, the GPIO interface may be configured to connect the processor 110 to the camera 193, the display screen 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type-C interface, or the like. The USB interface may be configured to connect to a charger to charge the mobile phone, or may be configured to transmit data between the mobile phone and a peripheral device, or may be configured to connect to a headset to play audio by using the headset. Alternatively, the interface may be configured to connect to another terminal device such as an augmented reality (AR) device.

It may be understood that an interface connection relationship between the modules shown in this embodiment of the present invention is merely an example for description, and does not constitute a limitation on the structure of the mobile phone. In some other embodiments of this application, the mobile phone may alternatively use an interface connection manner different from that in the foregoing embodiments, or use a combination of a plurality of interface connection manners.

The charging management module 140 is configured to receive charging input from the charger. The charger may be a wireless charger or a wired charger. In some embodiments of wired charging, the charging management module 140 may receive a charging input of a wired charger through the USB interface. In some embodiments of wireless charging, the charging management module 140 may receive wireless charging input by using a wireless charging coil of the mobile phone. The charging management module 140 supplies power to the terminal device by using the power management module 141 while charging the battery 142.

The power management module 141 is configured to connect the battery 142 and the charging management module 140 to the processor 110. The power management module 141 receives input from the battery 142 and/or the charging management module 140, and supplies power to the processor 110, the internal memory 121, an external memory, the display screen 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the mobile phone may be implemented by using an antenna module 1, an antenna module 2, the mobile communications module 150, the wireless communications module 160, the modem processor, the baseband processor, and the like.

The antenna 1 and the antenna 2 are configured to: transmit and receive electromagnetic wave signals. Each antenna in the mobile phone may be configured to cover one or more communication bands. Different antennas may be further multiplexed to improve antenna utilization. For example, a cellular network antenna may be multiplexed as a wireless local area network diversity antenna. In some other embodiments, an antenna may be used in combination with a tuning switch.

The mobile communications module 150 may provide a wireless communication solution that includes 2G/3G/4G/5G or the like and that is applied to the mobile phone. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video by using the display screen 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the mobile phone, to wireless communication including a wireless local area network (WLAN), Bluetooth (BT), a global navigation satellite system (GNSS), frequency modulation (FM), near field communication (NFC), infrared (IR) technology, and the like. The wireless communications module 160 may be one or more components integrated into at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 of the mobile phone are coupled, and the antenna 2 and the wireless communications module 160 of the mobile phone are coupled, so that the mobile phone can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The mobile phone implements a display function by using the GPU, the display screen 194, the application processor, and the like. The GPU is a microprocessor for image processing, and connects the display screen 194 to the application processor. The GPU is configured to: perform mathematical and geometric calculation, and render an image. The processor 110 may include one or more GPUs that execute a program instruction to generate or change display information.

The display screen 194 is configured to display an image, a video, and the like. The display screen 194 includes a display panel. The display panel may use an LCD (liquid crystal display, liquid crystal display screen), an OLED (organic light-emitting diode), an active-matrix organic light emitting diode (AMOLED), a flexible light-emitting diode (flex light-emitting diode, FLED), a mini-LED, a micro-LED, a micro-OLED, a quantum dot light-emitting diode (QLED), or the like. In some embodiments, the mobile phone may include one or N display screens, where N is a positive integer greater than 1.

The mobile phone may implement a photographing function by using the ISP, the camera 193, the video codec, the GPU, the display screen 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform optimization, using an algorithm, on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the mobile phone may include one or N cameras, where N is a positive integer greater than 1.

The digital signal processor is configured to process a digital signal, and may process another digital signal in addition to the digital image signal. For example, when the mobile phone selects a frequency, the digital signal processor is configured to perform Fourier transform on frequency energy, and the like.

The video codec is configured to: compress or decompress a digital video. The mobile phone may support one or more video codecs. In this way, the mobile phone may play or record videos in a plurality of coding formats, for example, MPEG1, MPEG2, MPEG3, and MPEG4.

The NPU is a neural-network (NN) computing processor. The NPU quickly processes input information with reference to a structure of a biological neural network, for example, with reference to a transfer mode between human brain neurons, and may further continuously perform self-learning. Applications such as intelligent cognition of the mobile phone, such as image recognition, facial recognition, speech recognition, and text understanding, can be implemented by using the NPU.

The external memory interface 120 may be configured to connect to an external storage card such as a micro SD card, to extend a storage capability of the mobile phone. The external storage card communicates with the processor 110 through the external memory interface 120, to implement a data storage function. For example, files such as music and a video are stored in the external storage card.

The internal memory 121 may be configured to store computer-executable program code. The executable program code includes an instruction. The processor 110 runs the instruction stored in the internal memory 121, to execute various function applications of the mobile phone and data processing. The memory 121 may include a program storage area and a data storage area. The program storage area may store an operating system, an application required by at least one function (for example, a sound playing function or an image playing function), and the like. The data storage area may store data (for example, audio data or an address book) created during use of the mobile phone, and the like. In addition, the memory 121 may include a high-speed random access memory, and may further include a nonvolatile memory such as at least one disk storage device, a flash memory, or a universal flash storage (UFS).

The mobile phone may implement an audio function such as music playing or recording by using the audio module 170, the speaker 170A, the receiver 170B, the microphone 170C, the headset interface 170D, the application processor, and the like.

The audio module 170 is configured to convert digital audio information into an analog audio signal for output, and is also configured to convert analog audio input into a digital audio signal. The audio module 170 may be further configured to: code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The mobile phone may listen to music by using the speaker 170A, or listen to a hands-free call.

The receiver 170B, also referred to as an "earpiece", is configured to convert an audio electrical signal into a sound signal. When a call is answered or voice information is received by using the mobile phone, the receiver 170B may be put close to a human ear to listen to a voice.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. At least one microphone 170C may be disposed in the mobile phone. In some other embodiments, two microphones may be disposed in the mobile phone, to collect a sound signal and further implement a noise reduction function. In some other embodiments, three, four, or more microphones may alternatively be disposed in the mobile phone, to collect a sound signal, reduce noise, further identify a sound source, implement a directional recording function, and the like.

The headset interface 170D is configured to connect to a wired headset. The headset interface may be a USB interface, or may be a 3.5 mm open mobile terminal device platform (open mobile terminal platform, OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display screen 194. There are a plurality of types of pressure sensors 180A, for example, a resistive pressure sensor, an inductive pressure sensor, a capacitive pressure sensor. The capacitive pressure sensor may include at least two parallel plates made of conductive materials. When a force is applied to the pressure sensor 180A, capacitance between electrodes changes. The mobile phone determines pressure intensity based on the change of the capacitance. When a touch operation is performed on the display screen 194, the mobile phone detects intensity of the touch operation by using the pressure sensor 180A. The mobile phone may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed.

The gyro sensor 180B may be configured to determine a moving posture of the mobile phone. In some embodiments, an angular velocity of the mobile phone around three axes (namely, x, y, and z axes) may be determined by using the gyro sensor 180B. The gyro sensor 180B may be configured to perform image stabilization during photographing. For example, when a shutter is pressed, the gyro sensor 180B detects an angle at which the mobile phone jitters, obtains, through calculation based on the angle, a distance for which a lens module needs to compensate, and allows a lens to cancel the jitter of the mobile phone through reverse motion, to implement image stabilization. The gyro sensor 180B may be further used in navigation and motion sensing game scenarios.

The barometric pressure sensor 180C is configured to measure barometric pressure. In some embodiments, the mobile phone calculates an altitude by using the barometric pressure measured by the barometric pressure sensor 180C, to assist in positioning and navigation.

The magnetic sensor 180D includes a Hall sensor. The mobile phone may detect opening and closing of a flip smart cover by using the magnetic sensor 180D. In some embodiments, when the mobile phone is a clamshell phone, the mobile phone may detect opening/closing of a flip cover based on the magnetic sensor 180D. Further, a feature such as automatic unlocking of the flip cover is set based on a detected opening/closing state of the smart cover or a detected opening/closing state of the flip cover.

The acceleration sensor 180E may detect values of acceleration in various directions (usually on three axes) of the mobile phone. When the mobile phone is still, a value and a direction of gravity may be detected. The acceleration sensor 180E may be further configured to identify a posture of the terminal device, and is applied to an application such as switching between landscape mode and portrait mode or a pedometer.

The distance sensor 180F is configured to measure a distance. The mobile phone may measure a distance through infrared light or a laser. In some embodiments, in a photographing scenario, the mobile phone may measure a distance by using the distance sensor 180F, to implement fast focusing.

The optical proximity sensor 180G may include a light-emitting diode (LED) and an optical detector, for example, a photodiode. The light-emitting diode may be an infrared light-emitting diode. The mobile phone emits infrared light by using the light-emitting diode. The mobile phone detects infrared reflected light from a nearby object by using the photodiode. When sufficient reflected light is detected, the mobile phone may determine that there is an object near the mobile phone. When insufficient reflected light is detected, the mobile phone may determine that there is no object near the mobile phone. The mobile phone may detect, by using the optical proximity sensor 180G, that the user holds the mobile phone close to an ear to make a call, so as to automatically turn off a screen for power saving. The optical proximity sensor 180G may also be used in a smart cover mode or a pocket mode to automatically unlock or lock the screen.

The ambient light sensor 180L is configured to sense ambient light brightness. The mobile phone may adaptively adjust brightness of the display screen 194 based on the sensed brightness of the ambient light. The ambient light sensor 180L may also be configured to automatically adjust white balance during photographing. The ambient light sensor 180L may also cooperate with the optical proximity sensor 180G to detect whether the mobile phone is in a pocket to prevent an accidental touch.

The fingerprint sensor 180H is configured to collect a fingerprint. The mobile phone may use a feature of the collected fingerprint to implement fingerprint unlocking, application access locking, fingerprint photographing, fingerprint call answering, and the like.

The temperature sensor 180J is configured to detect a temperature. In some embodiments, the mobile phone executes a temperature processing policy based on the temperature detected by the temperature sensor 180J. For example, when the temperature reported by the temperature sensor 180J exceeds a threshold, the mobile phone lowers performance of a processor near the temperature sensor 180J, to reduce power consumption for thermal protection. In some other embodiments, when the temperature is less than another threshold, the mobile phone heats the battery 142 to prevent the mobile phone from being shut down abnormally because of a low temperature. In some other embodiments, when the temperature is less than still another threshold, the mobile phone boosts an output voltage of the battery 142 to avoid abnormal shutdown caused by a low temperature.

The touch sensor 180K is also referred to as a "touch panel", and may be disposed on the display screen 194. The touch sensor 180K is configured to detect a touch operation performed on or near the touch sensor 180K. The touch sensor 180K may transfer the detected touch operation to the application processor, to determine a type of the touch event, and to provide corresponding visual output by using the display screen 194. In some other embodiments, the touch sensor 180K may alternatively be disposed on a surface of the mobile phone and is at a location different from that of the display screen 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may also be disposed in the headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button may be a mechanical button, or may be a touch button. The mobile phone receives button input, and generates button signal input related to a user setting and function control of the mobile phone.

The motor 191 may generate a vibration prompt. The motor 191 may be configured to produce an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display screen 194. Different application scenarios (for example, a time reminder, information receiving, an alarm clock, a game, and the like) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to be connected to a subscriber identity module (SIM). The SIM card may be inserted into the SIM card interface or plugged from the SIM card interface, to implement contact with or separation from the mobile phone. The mobile phone may support one or N SIM card interfaces, where N is a positive integer greater than 1. The SIM card interface 195 may support a nano SIM card, a micro SIM card, a SIM card, and the like. A plurality of cards may be inserted into a same SIM card interface simultaneously. The plurality of cards may be of a same type or of different types. The SIM card interface 195 may also be compatible with different types of SIM cards. The SIM card interface 195 may also be compatible with an external storage card. The mobile phone interacts with a network by using the SIM card, to implement functions such as calling and data communication. In some embodiments, the mobile phone uses an eSIM, namely, an embedded SIM card. The eSIM card may be embedded in the mobile phone, and cannot be separated from the mobile phone. A software system of the mobile phone may use a layered architecture, an event-driven architecture, a microkernel architecture, a micro service architecture, or a cloud architecture. In this embodiment of the present invention, an Android system with the layered architecture is used as an example to describe a software structure of the mobile phone.

Figure 6:
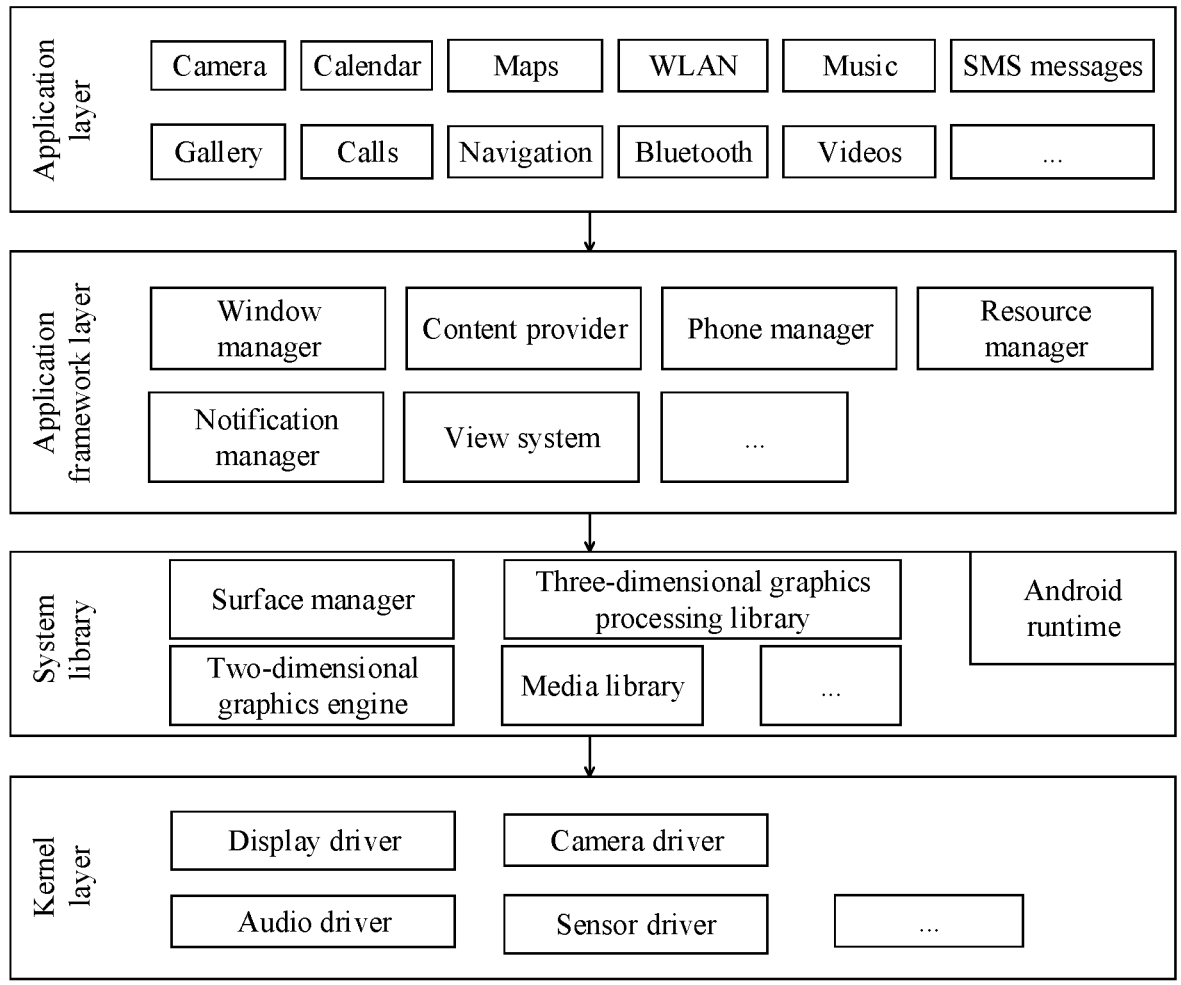
FIG. 6 is a schematic architectural diagram of an Android system according to an embodiment of this application.

FIG. 6 is a block diagram of a software structure of a mobile phone according to an embodiment of the present invention.

In the layered architecture, software is divided into several layers, and each layer has a clear role and task. The layers communicate with each other through a software interface. In some embodiments, the Android system is divided into four layers, namely, an application layer, an application framework layer, an Android runtime and system library, and a kernel layer from top to bottom.

The application layer may include a series of application packages.

As shown in FIG. 6, the application package may include applications such as "camera", "gallery", "calendar", "calls", "maps", "navigation", "WLAN", "Bluetooth", "music", "videos", and "SMS messages".

The application framework layer provides an application programming interface (API) and a programming framework for an application at the application layer. The application framework layer includes some predefined functions.

As shown in FIG. 6, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to: store and obtain data, and enable the data to be accessed by an application. The data may include a video, an image, audio, calls that are made and received, a browsing history and a bookmark, a phone book, and the like.

The view system includes visual controls such as a control for displaying a text and a control for displaying a picture. The view system may be configured to construct an application. A display interface may include one or more views. For example, a display interface including a Messages notification icon may include a text display view and a picture display view.

The phone manager is configured to provide a communication function of the mobile phone, for example, management of a call status (including answering or declining).

The resource manager provides various resources for an application, such as a localized character string, an icon, a picture, a layout file, and a video file.

The notification manager enables an application to display notification information in a status bar, and may be configured to convey a notification message. The notification manager may automatically disappear after a short pause without requiring a user interaction. For example, the notification manager is configured to: notify download completion, give a message notification, and the like. The notification manager may alternatively be a notification that appears in a top status bar of the system in a form of a graph or a scroll bar text, for example, a notification of an application running on a background or a notification that appears on the screen in a form of a dialog window. For example, text information is prompted in the status bar, a prompt tone is produced, a terminal device vibrates, or an indicator light blinks.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playing and recording of a plurality of commonly used audio and video formats, static image files, and the like. The media library may support a plurality of audio and video coding formats such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 7:
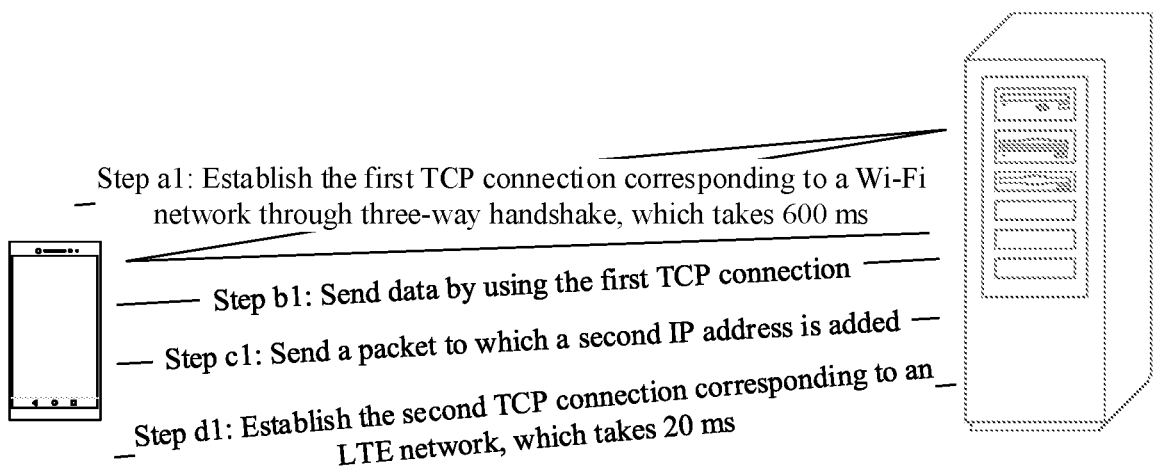
FIG. 7 is a schematic diagram of an MPTCP establishment process according to the current technology.

FIG. 7 is a schematic diagram of an example of a conventional MPTCP establishment process. It is assumed that when a signal of a Wi-Fi network is weak, a data transmission delay required for one information transmission between a mobile phone and an application server is 200 ms; or when a signal of an LTE network is strong, a data transmission delay required for one information transmission between a mobile phone and an application server is 20 ms. In FIG. 7, in step a1, it takes 600 ms for the mobile phone to perform three-way handshake with the application server on the Wi-Fi network to complete establishment of the first TCP connection corresponding to the Wi-Fi network. Step b1: After the first TCP connection is successfully established, the application server sends data to the mobile phone by using the first TCP connection. Step c1: Then, the mobile phone sends, to the application server by using the first TCP connection, a packet to which a second IP address is added. This process takes 200 ms. Step d1: The application server sends acknowledgment information to the mobile phone in the LTE network by using the second IP address, that is, the mobile phone and the application server establish, by using the second IP address, the second TCP connection corresponding to the LTE network. This process takes 20 ms. Finally, the mobile phone performs data transmission with the application server by using the two TCP connections at the same time.

If the MPTCP establishment process occurs in a playing start time period of a video, it means that video stream data has not been transmitted for 600 ms, and a playing start delay is relatively long. If a signal of a router connected to the mobile phone is unstable and the mobile phone cannot access the Internet, the first TCP connection may fail to be established. Consequently, the MPTCP establishment fails, and the video cannot be played properly. In other words, there is a problem that a data transmission delay of the first TCP connection is relatively long in a conventional MPTCP establishment manner.

Figure 8:
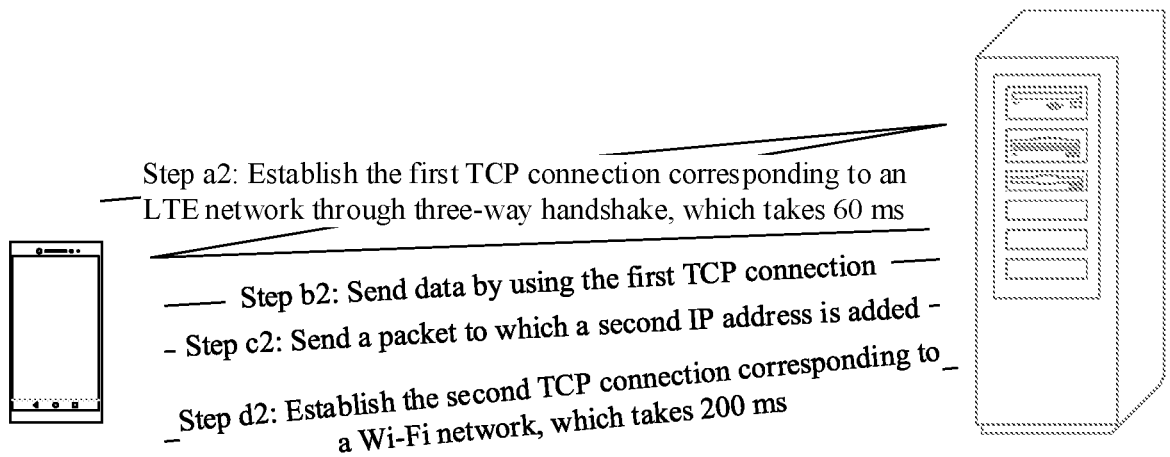
FIG. 8 is a schematic diagram of an MPTCP establishment process according to an embodiment of this application.

For the foregoing problem of the MPTCP establishment manner, an embodiment of this application provides a connection establishment method. The method optimizes the MPTCP establishment manner in FIG. 7. For example, an optimized MPTCP establishment manner is shown in FIG. 8. In FIG. 8, in step a2, a mobile phone first performs three-way handshake with an application server in an LTE network, so that it takes only 60 ms to complete establishment of the first TCP connection corresponding to the LTE network. Step b2: After the first TCP connection is successfully established, the application server sends data to the mobile phone by using the first TCP connection. Step c2: Then, the mobile phone sends, to the application server by using the first TCP connection, a packet to which a second IP address is added. This process takes 20 ms. Step d2: Then, the application server sends acknowledgment information to the mobile phone in a Wi-Fi network by using the second IP address, that is, the mobile phone and the application server establish, by using the second IP address, the second TCP connection corresponding to the Wi-Fi network. This process takes 200 ms. Finally, the mobile phone performs data transmission with the application server by using the two TCP connections at the same time.

The first TCP connection in FIG. 8 needs only 60 ms to be established, which saves 540 ms compared with 600 ms in FIG. 7, and can achieve an objective of shortening a playing start delay and improving user experience.

In other words, an embodiment of this application provides a connection establishment method. The method includes: When a terminal device detects that both an interface of a Wi-Fi network and an interface of the cellular network are available (for example, function switches of both the cellular network and the Wi-Fi network are turned on), the terminal device may first establish the first TCP connection to an application server through an interface of a network with a relatively small data transmission delay. After the first TCP connection is successfully established, the terminal device then establishes the second TCP connection to the application server through an interface of the other network. Specifically, the terminal device may determine, based on a data transmission delay that is of each TCP connection of an MPTCP and that is recorded in historical data, a target network with a relatively small data transmission delay. The terminal device may first establish the first TCP connection in the target network. For example, when a sum, recorded in the historical data, of a first average value of a data transmission delay of a TCP connection corresponding to the Wi-Fi network and two standard deviations is less than a second average value of a data transmission delay of a TCP connection corresponding to an LTE network, the terminal first establishes the first TCP connection to the application server through the interface of the Wi-Fi network. After the first TCP connection is successfully established, the second TCP connection is established to the application server through an interface of the LTE network.

The following describes in detail the connection establishment method according to an embodiment of this application with reference to the accompanying drawings and application scenarios.

Figure 9:
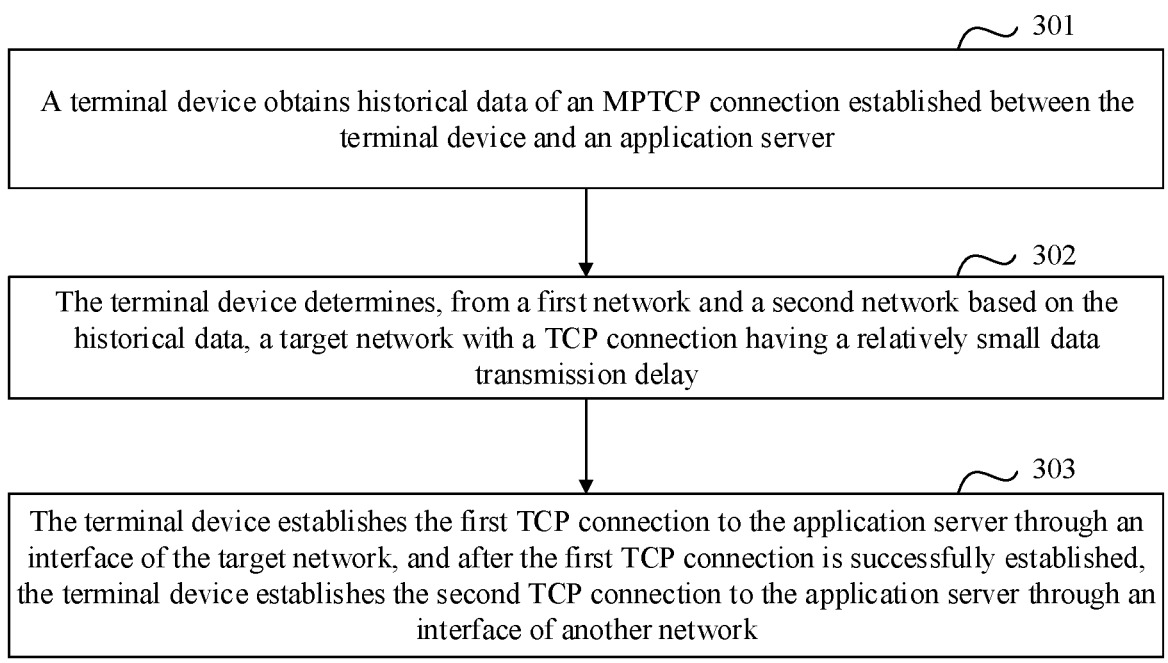
FIG. 9 is a schematic flowchart of a connection establishment method according to an embodiment of this application.

FIG. 9 shows an example of a procedure of a connection establishment method according to an embodiment of this application. The method is performed by a terminal device, and the method includes the following steps.

Step 301: The terminal device obtains historical data of an MPTCP connection established between the terminal device and an application server.

The historical data includes a data transmission delay of a TCP connection corresponding to a Wi-Fi network and a data transmission delay of a TCP connection corresponding to a cellular network.

For example, if a mobile phone is currently connected to both the Wi-Fi network and an LTE network at the same time in a process of playing a video in a Huawei video application, the mobile phone may obtain historical data of three MPTCPs established between the mobile phone and a Huawei video application server in the last 1 minute during 10-minute playing duration of the video. For example, specific content of the historical data of the three MPTCPs is shown in Table 1.

TABLE 1

| Application identifier | Data transmission delay of the TCP connection corresponding to the Wi-Fi network | Data transmission delay of the TCP connection corresponding to the cellular network |
|---|---|---|
| Identifier of the Huawei video application (for example, 001) | a1 | b1 |
| Identifier of the Huawei video application | a2 | b2 |

TABLE 1-continued

| Application identifier | Data transmission delay of the TCP connection corresponding to the Wi-Fi network | Data transmission delay of the TCP connection corresponding to the cellular network |
| --- | --- | --- |
| Identifier of the Huawei video application | a3 | b3 |

Step 302: The terminal device determines, from the Wi-Fi network and the cellular network based on the historical data, a target network with a TCP connection having a relatively small data transmission delay.

In a possible design, if data transmission delays of the TCP connection conform to normal distribution, the terminal device may calculate, according to Formula 1, Formula 2, and Formula 3, a first average value and a standard deviation of the data transmission delay of the TCP connection corresponding to the Wi-Fi network, and a second average value of the data transmission delay of the TCP connection corresponding to the cellular network.

$$\mu1 = \frac{x_1 + x_2 + x_3 + \ldots + x_i + \ldots + x_N}{N};$$ (Formula 1)

$$\sigma = \sqrt{\frac{1}{N}\sum_{i=1}^{N}(x_i - \mu1)^2}; \text{ and}$$ (Formula 2)

$$\mu2 = \frac{y_1 + y_2 + y_3 + \ldots + y_i + \ldots + y_M}{M},$$ (Formula 3)

where

μ1 is the first average value, μ2 is the second average value, σ is the standard deviation, $x_1$ to $x_N$ are data transmission delays of the TCP connection corresponding to the Wi-Fi network, N is a quantity of data transmission delays of the TCP connection corresponding to the Wi-Fi network, $y_1$ to $y_M$ are data transmission delays of the TCP connection corresponding to the cellular network, and M is a quantity of data transmission delays of the TCP connection corresponding to the cellular network.

If μ2≤μ1+2×σ, the terminal device determines that the data transmission delay of the TCP connection corresponding to the cellular network is less than or equal to the data transmission delay of the TCP connection corresponding to the Wi-Fi network; or if μ2>μ1+2×σ, the terminal device determines that the data transmission delay of the TCP connection corresponding to the cellular network is greater than the data transmission delay of the TCP connection corresponding to the Wi-Fi network.

It should be noted that the standard deviation mainly reflects jitter of the data transmission delay of the TCP connection corresponding to the Wi-Fi network. On the Wi-Fi network, a packet loss rate of the Wi-Fi network may be high due to co-channel interference, a quantity of access users, and rate limiting, and the data transmission delay varies greatly at different moments. Therefore, when selecting the target network, the terminal device needs to consider an average value of the data transmission delay of the TCP connection corresponding to the Wi-Fi network, and further needs to perform comprehensive determining with reference to the standard deviation. It should be noted that because jitter of the cellular network is relatively small, a standard deviation of the data transmission delay of the TCP connection corresponding to the cellular network may not be considered in this embodiment of this application.

For example, the mobile phone may calculate, according to Formula 1, the first average value μ1 of three data transmission delays of the TCP connection corresponding to the Wi-Fi network in Table 1, calculate the standard deviation a according to Formula 2, and further calculate, according to Formula 3, the second average value μ2 of three data transmission delays of the TCP connection corresponding to the LTE network. If μ1+2σ is less than or equal to the second average value μ2, the mobile phone determines that the Wi-Fi network is the target network; otherwise, the mobile phone determines that the LTE network is the target network.

$$\mu1 = \frac{a1 + a2 + a3}{3};$$ (Formula 1)

$$\sigma = \sqrt{\frac{1}{3}\sum_{i=1}^{3}(x_i - \mu1)^2}; \text{ and}$$ (Formula 2)

$$\mu2 = \frac{b1 + b2 + b3}{3}.$$ (Formula 3)

In a possible design, the terminal device may also set weight values of MPTCP connections established at different moments. A data transmission delay of a TCP connection that is established earlier in TCP connections corresponding to the cellular network has a lower weight. In this way, the terminal device may further calculate, according to Formula 4, a second weighted average value of the data transmission delay of the TCP connection corresponding to the LTE network in the historical data.

$$\mu2' = \frac{y_1 \times \omega_1 + y_2 \times \omega_{12} + y_3 \times \omega_3 + \ldots + y_i \times \omega_i + \ldots + y_M \times \omega_M}{M},$$ (Formula 4)

where

μ2' is the second weighted average value, $\omega_1$ to $\omega_M$ are weight values of the data transmission delay of the TCP connection corresponding to the cellular network, $y_1$ to $y_M$ are data transmission delays of the TCP connection corresponding to the cellular network, and M is a quantity of data transmission delays of the TCP connection corresponding to the cellular network.

In this case, if μ2'≤μ1+2×σ, the terminal device determines that the data transmission delay of the TCP connection corresponding to the cellular network is less than or equal to the data transmission delay of the TCP connection corresponding to the Wi-Fi network; or if μ2'>μ1+2×σ, the terminal device determines that the data transmission delay of the TCP connection corresponding to the cellular network is greater than the data transmission delay of the TCP connection corresponding to the Wi-Fi network.

For example, assuming that weight values of b1, b2, and b3 in the data transmission delays of the TCP connection corresponding to the cellular network in Table 1 are respectively ω1, ω2, and ω3, the terminal device may further calculate, according to Formula 4, a second weighted average value μ2' of three data transmission delays of the TCP connection corresponding to the LTE network. If μ1+2σ is less than or equal to the second average value μ2, and μ1+2σ is less than or equal to the second weighted average value μ2', the mobile phone determines that the Wi-Fi network is the target network; otherwise, the mobile phone determines that the LTE network is the target network.

$$\mu 2' = \frac{b1*\omega 1 + b2*\omega 2 + b3*\omega 3}{3} \quad \text{(Formula 4)}$$

Step 303: After determining the target network, the terminal device establishes the first TCP connection to the application server through an interface of the target network, and after the first TCP connection is successfully established, the terminal device establishes the second TCP connection to the application server through an interface of another network.

In other words, after determining that the Wi-Fi network is the target network, the terminal device first establishes the first TCP connection to the application server through an interface of the Wi-Fi network, and then establishes the second TCP connection to the application server through an interface of the LTE network after the first TCP connection is successfully established. Alternatively, after determining that the cellular network is the target network, the terminal device first establishes the first TCP connection to the application server through an interface of the cellular network, and then establishes the second TCP connection to the application server through an interface of the Wi-Fi network after the first TCP connection is successfully established.

Considering that the historical data may include historical data of MPTCP connections of different applications, and if a location of the terminal device moves, a base station currently accessed by the terminal device may be different from a base station accessed by the TCP connection that corresponds to the cellular network and that is in the historical data. Alternatively, a service set identifier (SSID) currently accessed by the terminal device may be different from an SSID accessed by the TCP connection that corresponds to the Wi-Fi network and that is in the historical data, so that the data transmission delay of the TCP connection is unavailable. If the historical data further includes an identifier of an application, an identifier of the cellular network, and an identifier of the Wi-Fi network, in a possible design, when performing step 302, the terminal device may first determine, from the historical data, a data transmission delay set of a target TCP connection whose identifier is the same as that of an application corresponding to the application server. Then, the terminal device determines, from the data transmission delay set of the target TCP connection, a first data transmission delay whose identifier is the same as that of a current cellular network; and determines, from the data transmission delay set of the target TCP connection based on the identifier of the Wi-Fi network, a second data transmission delay whose identifier is the same as that of a current Wi-Fi network. The terminal device calculates the first average value, the standard deviation, the second average value, and the second weighted average value based on the first data transmission delay and the second data transmission delay and according to Formula 1 to Formula 4.

For example, if a mobile phone is currently connected to both the Wi-Fi network and an LTE network at the same time in a process of playing a video in a Huawei video application, the mobile phone may obtain historical data of three MPTCPs established between the mobile phone and a Huawei video application server in the last 1 minute during 10-minute playing duration of the video. For example, specific content of the historical data of the three MPTCPs is shown in Table 2.

TABLE 2

| Application identifier | Data transmission delay of the TCP connection corresponding to the Wi-Fi network | Data transmission delay of the TCP connection corresponding to the cellular network | Identifier of the Wi-Fi network | Identifier of the cellular network |
|---|---|---|---|---|
| Identifier of the Huawei video application (for example, 001) | a1 | b1 | SSID = myhome | Cell ID = 100 |
| Identifier of the Huawei video application | a2 | b2 | SSID = myhome | Cell ID = 100 |
| Identifier of the Huawei video application | a3 | b3 | SSID = myoffice | Cell ID = 101 |

Assuming that an identifier of an application currently run on the mobile phone is 001, a currently accessed SSID is myhome, and a cell ID is 100, the mobile phone may calculate a first average value, a standard deviation, a second average value, and a second weighted average value by using only a1, a2, b1, and b2. A specific calculation manner is shown in the foregoing formulas, and details are not described herein again.

In another possible design, the terminal device may set an aging time, to clear historical data that occurs before specified duration from a current moment, and retain only historical data of a latest MPTCP connection. For example, the terminal device clears historical data of an MPTCP connection before 1 minute from the current moment, and retain only historical data of an MPTCP connection within 1 minute from the current moment. Such historical data can accurately reflect sizes of data transmission delays of TCP connections of the Wi-Fi network and the cellular network, and help determine the target network.

In a possible design, if a location of the terminal device changes or the terminal is in a critical location of two cells, an access point of a cellular base station or a wireless router that is currently accessed by the terminal device changes. In other words, interfaces of a cellular network and a Wi-Fi network that are currently accessed are different from an interface of an MPTCP connection in the historical data. In this case, a first data transmission delay of a TCP connection corresponding to the interface of the currently accessed cellular network and a first application identifier and a second data transmission delay of a TCP connection corresponding to the interface of the currently accessed Wi-Fi network and the first application identifier may not be found from the historical data. In this case, when both the interface of the Wi-Fi network and the interface of the cellular network are available, the terminal device may determine whether the currently accessed cellular network is an LTE network and whether signal strength is greater than a specified threshold. If both conditions are met, the terminal device determines that the target network is the LTE network, and first establishes the first TCP connection to the application server through an interface of the LTE network. Otherwise, the terminal device first establishes the first TCP connection to the application server through the interface of the Wi-Fi network. The LTE network in the cellular network is first selected because a current LTE network has a relatively small data transmission delay compared with a 2G network and a 3G network.

Considering that it may take 200 ms for the terminal device to activate the cellular network when the terminal device establishes the first TCP connection to the application server by using the cellular network, before establishing the first TCP connection to the application server by using the cellular network, the terminal device may first send a packet to a cellular base station accessed by the terminal device, to activate the cellular network of the terminal device. This is because the cellular network of the terminal device is in a sleep state when the cellular network is not used, and a wake-up process requires about 200 ms duration. If a packet is generated before the terminal device establishes a TCP connection corresponding to the cellular network, the cellular network may be woken up in advance, thereby saving about 200 ms. In an actual design, the packet sent by the terminal device may be a User Datagram Protocol (UDP) packet, and the cellular base station does not need to return information after receiving the packet. In addition, a destination IP address corresponding to the packet may be an IP address of a receiver that does not exist, so as to prevent a packet used to activate the cellular network from being identified as an attack packet.

Figure 10A:
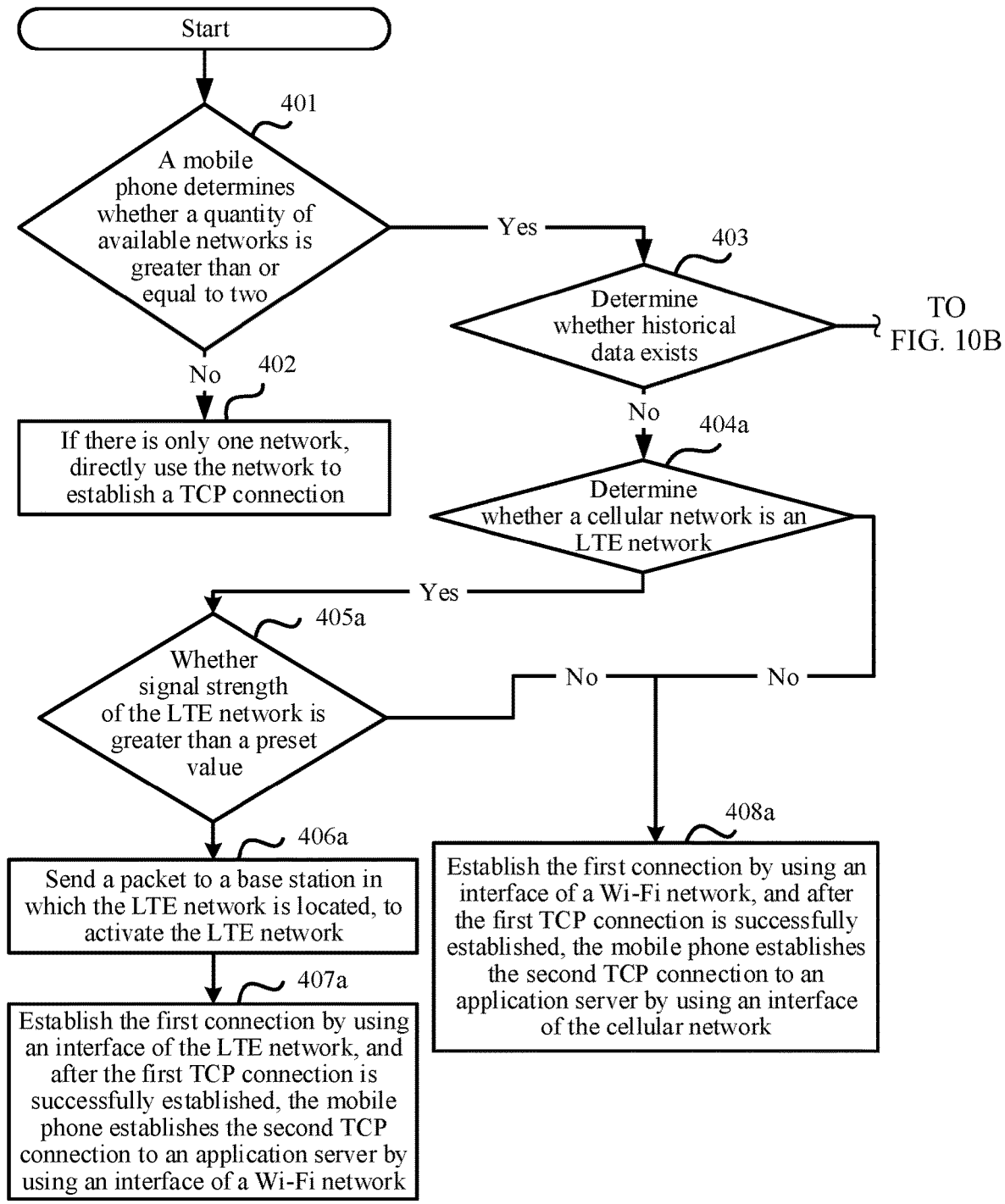
FIG. 10A and FIG. 10B are a schematic flowchart of a connection establishment method according to an embodiment of this application.
Figure 10B:
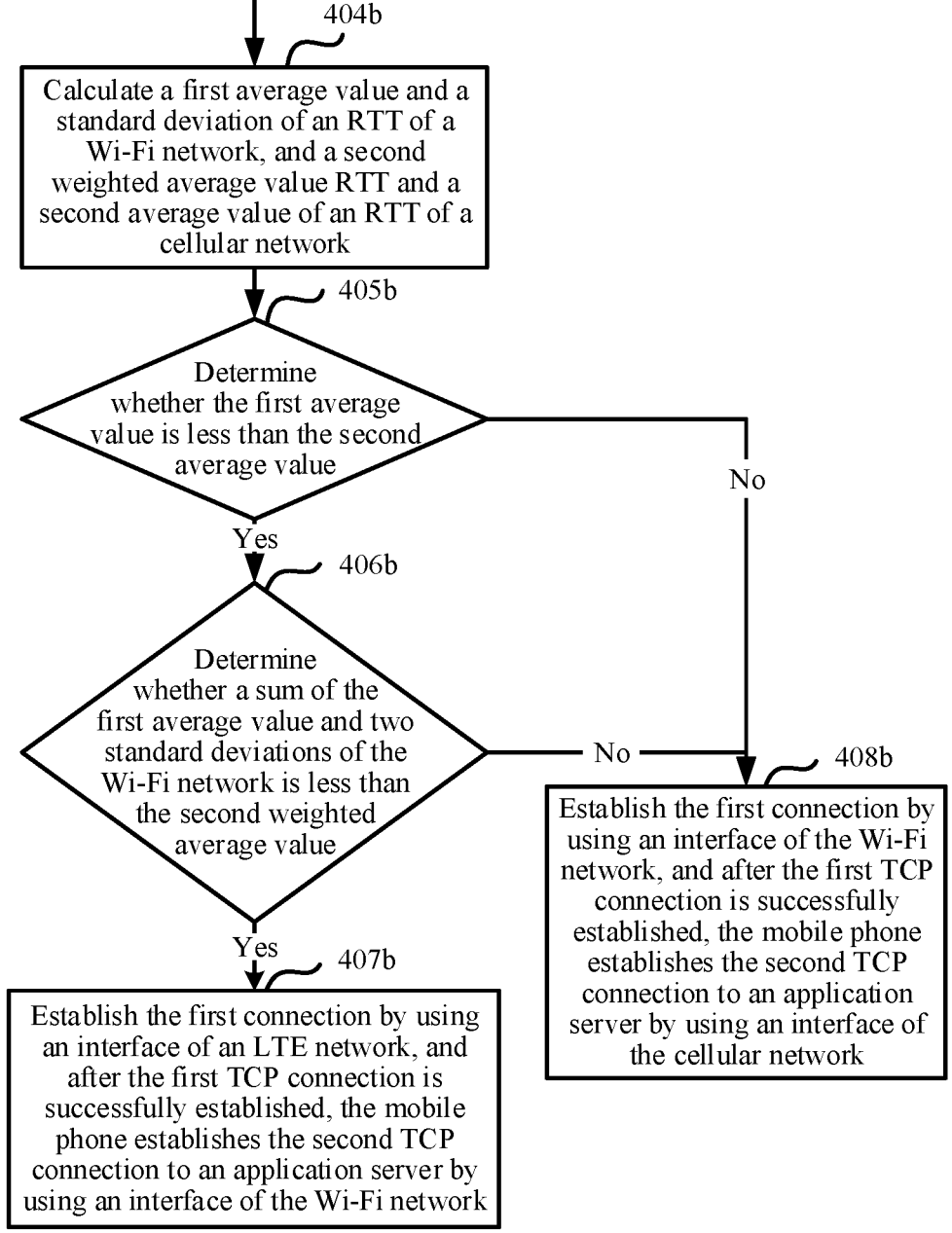

With reference to a method flowchart shown in FIG. 10A and FIG. 10B, the following mainly describes in detail the connection establishment method shown in FIG. 9 by using an example in which a mobile phone establishes an MPTCP when playing streaming media from a video application server.

Step 401: The mobile phone establishes a network connection to a Huawei video application server in response to an operation instruction of a user in a Huawei video application. The mobile phone determines whether a Wi-Fi network and an LTE network are currently available at the same time. If the Wi-Fi network and the LTE network are not available at the same time, step 402 is performed; otherwise, step 403 is performed.

Step 402: If the mobile phone determines that only one network is available currently, the mobile phone directly selects the network to create a TCP connection.

Step 403: If the mobile phone determines that both the Wi-Fi network and the LTE network are available currently, the mobile phone determines whether historical data exists, for example, whether data of a historically established MPTCP exists in a previous minute. If the historical data does not exist, step 404a is performed; otherwise, step 404b is performed.

Step 404a: If a location of the mobile phone changes, there is no historical data that is the same as that of a cell and an SSID that are currently accessed. In this case, the mobile phone determines whether a currently accessed cellular network is an LTE network. If the currently accessed cellular network is the LTE network, step 405a is performed; otherwise, step 408a is performed.

Step 405a: The mobile phone determines whether an RSSI of the LTE network is greater than a set value. If the RSSI of the LTE network is greater than the set value, step 406a is performed; otherwise, step 408a is performed.

Step 406a: The mobile phone sends a UDP packet to a base station of the LTE network accessed by the mobile phone, where the UDP packet is used to activate the LTE network.

Step 407a: The mobile phone establishes the first TCP connection by using an interface of the LTE network, and after the first TCP connection is successfully established, the mobile phone establishes the second TCP connection to the application server by using an interface of the Wi-Fi network.

Step 408a: If the mobile phone determines that the currently accessed cellular network is a 2G network or a 3G network, or a received signal strength indicator (RSSI) of the LTE network currently accessed by the mobile phone is less than or equal to a set value (for example, a quantity of signal bars is less than or equal to three), the mobile phone establishes the first TCP connection by using an interface of the Wi-Fi network. After the first TCP connection is successfully established, the mobile phone establishes the second TCP connection to the application server by using an interface of the cellular network.

Step 404b: If the historical data includes historical data that is the same as that of a cell and an SSID that are currently accessed by the mobile phone, the mobile phone obtains a data transmission delay of a TCP connection corresponding to a cellular network and a data transmission delay of a TCP connection corresponding to the Wi-Fi network. If the data transmission delays of the TCP connections conform to normal distribution, the mobile phone calculates a first average value and a standard deviation of a round-trip time (RTT) delay of the TCP connection corresponding to the Wi-Fi network, and a second weighted average value and a second average value of an RTT of the TCP connection corresponding to the cellular network.

Step 405b: The mobile phone determines whether the first average value is less than the second average value, and if the first average value is less than the second average value, step 406b is performed; otherwise, step 408b is performed.

Step 406b: The mobile phone then determines whether a sum of the first average value and two standard deviations is less than the second weighted average value, and if the sum is less than the second weighted average value, step 407b is performed; otherwise, step 408b is performed.

Step 407b: The mobile phone establishes the first TCP connection by using an interface of the LTE network, and after the first TCP connection is successfully established, the mobile phone establishes the second TCP connection to the application server by using an interface of the Wi-Fi network.

Step 408b: The mobile phone establishes the first TCP connection by using an interface of the cellular network, and after the first TCP connection is successfully established, the mobile phone establishes the second TCP connection to the application server by using an interface of the Wi-Fi network.

Finally, the mobile phone records RTTs used for establishing the two TCP connections, and then saves the RTTs as historical data for subsequent MPTCP establishment.

In conclusion, each time after establishing the MPTCP, the terminal device may record a data transmission delay of each TCP connection of the MPTCP. Therefore, the terminal device does not need to use a delay detection means or send another packet to obtain data transmission delay information of a historical TCP connection, and availability is relatively high. In addition, the terminal device first establishes the first TCP connection in a network with a relatively small data transmission delay, so that a playing start delay can be significantly reduced. Currently, it is found through a test that, when the mobile phone starts iQIYI to play a video, if signals of an LTE network and a Wi-Fi network that are currently accessed by the mobile phone are relatively good, in this application, a playing start delay of about 0.32 second can be reduced compared with a conventional MPTCP establishment manner; or if a signal of an LTE network currently accessed by the mobile phone is relatively strong, but a signal of a Wi-Fi network is relatively weak, in this application, a playing start delay of about 0.25 second can be reduced. The method provided in this embodiment of this application may be completely performed by the terminal device, and does not need to obtain data from a service side, that is, optimization is performed only on a terminal side. Therefore, optimization costs are relatively low.

An embodiment of this application further provides a computer-readable storage medium. The computer-readable storage medium includes a computer program. When the computer program is run on a terminal device, the terminal device is enabled to perform any possible implementation of the foregoing connection establishment method.

An embodiment of this application further provides a computer program product. When the computer program product runs on a terminal device, the terminal device is enabled to perform any possible implementation of the foregoing connection establishment method.

Figure 11:
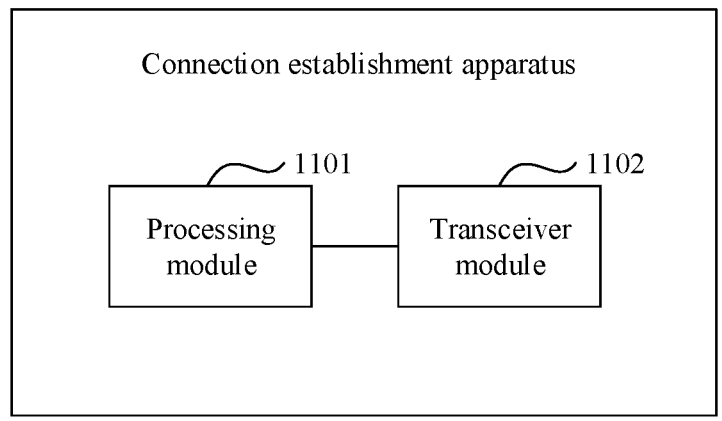
FIG. 11 is a schematic diagram of a connection establishment apparatus according to an embodiment of this application.

In some embodiments of this application, an embodiment of this application discloses a connection establishment apparatus. As shown in FIG. 11, the data transmission apparatus is configured to implement the method recorded in the foregoing method embodiments, and includes a processing module 1101 and a transceiver module 1102. The processing module 1101 is configured to support a terminal device in performing step 301 to step 303 in FIG. 9 and step 401 to step 408b in FIG. 10A and FIG. 10B. The transceiver module 1102 is configured to support the terminal device in sending a packet to a base station of an accessed cellular network, to activate a cellular network of the terminal device. All related content of the steps in the foregoing method embodiments may be cited in function descriptions of the corresponding functional modules. Details are not described herein again.

Figure 12:
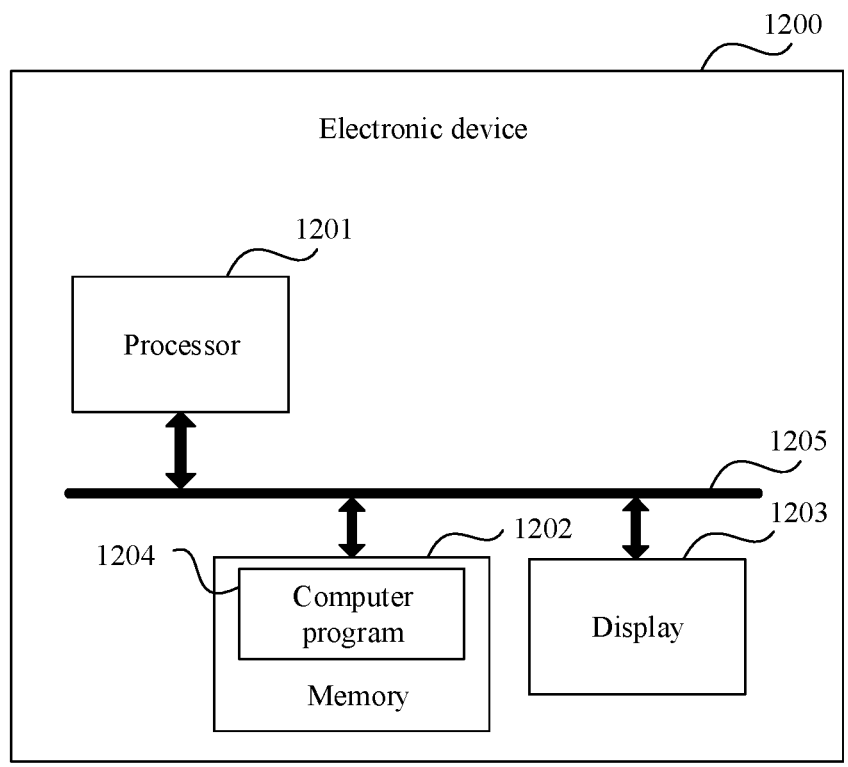
FIG. 12 is a schematic structural diagram of a terminal device according to an embodiment of this application.

In some other embodiments of this application, an embodiment of this application discloses a terminal device. As shown in FIG. 12, the terminal device may include one or more processors 1201, a memory 1202, a display 1203, one or more applications, and one or more computer programs 1204. The foregoing components may be connected with each other by using one or more communications buses 1205. The one or more computer programs 1204 are stored in the memory 1202 and are executed by the one or more processors 1201. The one or more computer programs 1204 include an instruction, and the instruction may be used to perform the steps in FIG. 9, FIG. 10A and FIG. 10B, and the corresponding embodiments.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, technical solutions of embodiments of this application may be implemented in the form of a software product. The computer software product is stored in a storage medium and includes several instructions for instructing a computer device (which may be a personal computer, a server, or a network device) or a processor to perform all or some of the steps of methods described in embodiments of this application. The foregoing storage medium includes: any medium that can store program code, such as a flash memory, a removable hard disk, a read-only memory, a random access memory, a magnetic disk, or an optical disc.

The foregoing descriptions are merely exemplary implementations of the embodiments of this application, but are not intended to limit the protection scope of the embodiments of this application. Any variation or replacement within the technical scope disclosed in the embodiments of this application may fall within the protection scope of this application.

What is claimed is:
1. A connection establishment method, comprising:
obtaining, by a terminal device, historical data of a multipath transmission control protocol (MPTCP) connection established between the terminal device and an application server,
wherein the historical data comprises a data transmission delay of a transmission control protocol (TCP) connection associated with a Wi-Fi network and a data transmission delay of a TCP connection associated with a cellular network;
determining, by the terminal device by using the historical data, a first average value µ1 of the data transmission delay of the TCP connection associated with the Wi-Fi network, a second average value µ2 of the data transmission delay of the TCP connection associated with the cellular network, and a standard deviation σ of the data transmission delay of the TCP connection associated with the Wi-Fi network, wherein

$$\mu 1 = \frac{x_1 + x_2 + x_3 + \ldots + x_i + \ldots + x_N}{N}; \quad (1)$$

$$\sigma = \sqrt{\frac{1}{N}\sum_{i=1}^{N}(x_i - \mu 1)^2}; \text{ and} \quad (2)$$

$$\mu 2 = \frac{y_1 + y_2 + y_3 + \ldots + y_i + \ldots + y_M}{M}; \quad (3)$$

based on µ2≤µ1+2×σ, determining, by the terminal device based on the historical data, that the data transmission delay of the TCP connection associated with the cellular network is less than or equal to the data transmission delay of the TCP connection associated with the Wi-Fi network,
  wherein $x_1$ to $x_N$ are data transmission delays of the TCP connection associated with the Wi-Fi network, N is a quantity of data transmission delays of the TCP connection associated with the Wi-Fi network, $y_1$ to $y_M$ are data transmission delays of the TCP connection associated with the cellular network, and M is a quantity of data transmission delays of the TCP connection associated with the cellular network;
based on determining that the data transmission delay of the TCP connection associated with the cellular network is less than or equal to the data transmission delay of the TCP connection associated with the Wi-Fi network, establishing, by the terminal device, a first TCP connection to the application server through an interface of the cellular network; and
after the first TCP connection is successfully established, establishing, by the terminal device, a second TCP connection to the application server through an interface of the Wi-Fi network.

2. The method according to claim 1, wherein after obtaining the historical data, the method further comprises:
  determining, by the terminal device and by using the historical data, a second weighted average value μ2' of the data transmission delay of the TCP connection associated with the cellular network, and the first average value μ1 and the standard deviation σ of the data transmission delay of the TCP connection associated with the Wi-Fi network; and
  based on μ2'≤μ1+2×σ, determining, by the terminal device, that the data transmission delay of the TCP connection associated with the cellular network is less than or equal to the data transmission delay of the TCP connection associated with the Wi-Fi network;
wherein $$\mu1 = \frac{x_1 + x_2 + x_3 + x_1 + \ldots + x_N}{N}; \tag{4}$$

$$\sigma = \sqrt{\frac{1}{N}\sum_{i=1}^{N}(x_i - \mu1)^2}; \text{ and} \tag{5}$$

$$\mu2' = \frac{y_2 + \omega_2 + y_3 \times \omega_{22} + y_3 \times \omega_3 + \ldots + y_1 + \omega_1 + \ldots + y_M + \omega_M}{M}; \tag{6}$$

wherein $x_1$ to $x_N$ are the data transmission delays of the TCP connection associated with the Wi-Fi network, N is the quantity of data transmission delays of the TCP connection associated with the Wi-Fi network, $y_1$ to $y_M$ are the data transmission delays of the TCP connection associated with the cellular network, M is the quantity of data transmission delays of the TCP connection associated with the cellular network, and $\omega_1$ to $\omega_M$ are weight values of the data transmission delays of the TCP connection associated with the cellular network, wherein a respective weight of a respective data transmission delay of the TCP connection associated with the cellular network with a relatively earlier establishment time is relatively lower than a respective data transmission delay of the TCP connection associated with the cellular network with a relatively later establishment time.

3. The method according to claim 1, wherein the historical data further comprises an identifier of an application, an identifier of the cellular network, and an identifier of the Wi-Fi network; and wherein the method further comprises:
  determining, by the terminal device from the historical data, a data transmission delay set of a target TCP connection whose identifier is the same as that of an application associated with the application server;
  determining, by the terminal device from the data transmission delay set of the target TCP connection based on the identifier of the cellular network, a first data transmission delay whose identifier is the same as that of a current cellular network;
  determining, by the terminal device from the data transmission delay set of the target TCP connection based on the identifier of the Wi-Fi network, a second data transmission delay whose identifier is the same as that of a current Wi-Fi network; and
  determining, by the terminal device based on the first data transmission delay and the second data transmission delay, that the data transmission delay of the TCP connection associated with the cellular network is less than or equal to the data transmission delay of the TCP connection associated with the Wi-Fi network.

4. The method according to claim 1, wherein the cellular network is a Long Term Evolution (LTE) network.

5. The method according to claim 1, wherein after establishing the second TCP connection, the method further comprises: storing, by the terminal device, data transmission delays of the first and second established TCP connections.

6. The method according to claim 1, wherein before establishing the first TCP connection, the method further comprises: sending, by the terminal device, a packet to a base station in the cellular network accessed by the terminal device to activate the cellular network of the terminal device.

7. A terminal device comprising:
  a memory configured to store processor-executable instructions; and
  a processor configured to execute the processor-executable instructions to facilitate the following being performed by the terminal device:
    obtaining historical data of a multipath transmission control protocol (MPTCP) connection established between the terminal device and an application server,
      wherein the historical data comprises a data transmission delay of a transmission control protocol (TCP) connection associated with a Wi-Fi network and a data transmission delay of a TCP connection associated with a cellular network;
    determining, by the terminal device by using the historical data a first average value μ1 of the data transmission delay of the TCP connection associated with the Wi-Fi network, a second average value μ2 of the data transmission delay of the TCP connection associated with the cellular network, and a standard deviation σ of the data transmission delay of the TCP connection associated with the Wi-Fi network,
    wherein $$\mu1 = \frac{x_1 + x_2 + x_3 + \ldots + x_i + \ldots + x_N}{N}; \tag{1}$$

$$\sigma = \sqrt{\frac{1}{N}\sum_{i=1}^{N}(x_i - \mu1)^2}; \text{ and} \tag{2}$$

-continued
$$\mu 2 = \frac{y_1 + y_2 + y_3 + \ldots + y_i + \ldots + y_M}{M}; \quad (3)$$

based on $\mu 2 \leq \mu 1 + 2 \times \sigma$, determining, by the terminal device based on the historical data, that the data transmission delay of the TCP connection associated with the cellular network is less than or equal to the data transmission delay of the TCP connection associated with the Wi-Fi network,
   wherein $x_1$ to $x_N$ are data transmission delays of the TCP connection associated with the Wi-Fi network, N is a quantity of data transmission delays of the TCP connection associated with the Wi-Fi network, $y_1$ to $y_M$ are data transmission delays of the TCP connection associated with the cellular network, and M is a quantity of data transmission delays of the TCP connection associated with the cellular network; and
   based on determining that the data transmission delay of the TCP connection associated with the cellular network is less than or equal to the data transmission delay of the TCP connection associated with the Wi-Fi network, establishing a first TCP connection to the application server through an interface of the cellular network, and after the first TCP connection is successfully established, establishing a second TCP connection to the application server through an interface of the Wi-Fi network.

8. The terminal device according to claim 7, wherein the processor is further configured to execute the processor-executable instructions to facilitate the following being performed by the terminal device:
   determining, by using the historical data, a second weighted average value $\mu 2'$ of the data transmission delay of the TCP connection associated with the cellular network, and the first average value $\mu 1$ and the standard deviation $\sigma$ of the data transmission delay of the TCP connection associated with the Wi-Fi network; and
   based on $\mu 2' \leq \mu 1 + 2 \times \sigma$, determining that the data transmission delay of the TCP connection associated with the cellular network is less than or equal to the data transmission delay of the TCP connection associated with the Wi-Fi network, or based on $\mu 2' > \mu 1 + 2 \times \sigma$, determining that the data transmission delay of the TCP connection associated with the cellular network is greater than the data transmission delay of the TCP connection associated with the Wi-Fi network;
wherein $$\mu 1 = \frac{x_1 + x_2 + x_3 + \ldots + x_i + \ldots + x_N}{N}; \quad (4)$$

$$\sigma = \sqrt{\frac{1}{N}\sum_{i=1}^{N}(x_i - \mu 1)^2}; \text{ and} \quad (5)$$

$$\mu 2 = \frac{y_1 + y_2 + y_3 + \ldots + y_i + \ldots + y_M}{M}; \quad (6)$$

wherein $x_1$ to $x_N$ are the data transmission delays of the TCP connection associated with the Wi-Fi network, N is the quantity of data transmission delays of the TCP connection associated with the Wi-Fi network, $y_1$ to $y_M$ are the data transmission delays of the TCP connection associated with the cellular network, M is the quantity of data transmission delays of the TCP connection associated with the cellular network, and $\omega_1$ to $\omega_M$ are weight values of the data transmission delays of the TCP connection associated with the cellular network, wherein a respective weight of a respective data transmission delay of the TCP connection associated with the cellular network with a relatively earlier establishment time is relatively lower than a respective data transmission delay of the TCP connection associated with the cellular network with a relatively later establishment time.

9. The terminal device according to claim 7, wherein the historical data further comprises an identifier of an application, an identifier of the cellular network, and an identifier of the Wi-Fi network; and
   wherein the processor is further configured to execute the processor-executable instructions to facilitate the following being performed by the terminal device:
      determining, from the historical data, a data transmission delay set of a target TCP connection whose identifier is the same as that of an application associated with the application server;
      determining, from the data transmission delay set of the target TCP connection based on the identifier of the cellular network, a first data transmission delay whose identifier is the same as that of a current cellular network;
      determining, from the data transmission delay set of the target TCP connection based on the identifier of the Wi-Fi network, a second data transmission delay whose identifier is the same as that of a current Wi-Fi network; and
      determining, based on the first data transmission delay and the second data transmission delay, that the data transmission delay of the TCP connection associated with the cellular network is less than or equal to the data transmission delay of the TCP connection associated with the Wi-Fi network.

10. The terminal device according to claim 7, wherein the cellular network is a Long Term Evolution (LTE) network.

11. The terminal device according to claim 7, wherein the processor is further configured to execute the processor-executable instructions to facilitate the following being performed by the terminal device: storing data transmission delays of the first and second established TCP connections.

12. The terminal device according to claim 7, wherein the processor is further configured to execute the processor-executable instructions to facilitate the following being performed by the terminal device:
   before establishing the first TCP connection to the application server through the interface of the cellular network, sending a packet to a base station in a cellular network accessed by the terminal device to activate the cellular network of the terminal device.

13. A non-transitory computer-readable storage medium having processor-executable instructions stored thereon, wherein the processor-executable instructions, when executed, facilitate:
   obtaining, by a terminal device, historical data of a multipath transmission control protocol (MPTCP) connection established between the terminal device and an application server,
      wherein the historical data comprises a data transmission delay of a transmission control protocol (TCP) connection associated with a Wi-Fi network and a data transmission delay of a TCP connection associated with a cellular network;

determining, by the terminal device by using the historical data a first average value µ1 of the data transmission delay of the TCP connection associated with the Wi-Fi network, a second average value µ2 of the data transmission delay of the TCP connection associated with the cellular network, and a standard deviation σ of the data transmission delay of the TCP connection associated with the Wi-Fi network, wherein $$\mu 1 = \frac{x_1 + x_2 + x_3 + \ldots + x_i + \ldots + x_N}{N}; \quad (1)$$

$$\sigma = \sqrt{\frac{1}{N}\sum_{i=1}^{N}(x_i - \mu 1)^2}; \text{ and} \quad (2)$$

$$\mu 2 = \frac{y_1 + y_2 + y_3 + \ldots + y_i + \ldots + y_M}{M}; \quad (3)$$

based on µ2≤µ1+2×σ, determining, by the terminal device based on the historical data, that the data transmission delay of the TCP connection associated with the cellular network is less than or equal to the data transmission delay of the TCP connection associated with the Wi-Fi network, wherein $x_1$ to $x_N$ are data transmission delays of the TCP connection associated with the Wi-Fi network, N is a quantity of data transmission delays of the TCP connection associated with the Wi-Fi network, $y_1$ to $y_M$ are data transmission delays of the TCP connection associated with the cellular network, and M is a quantity of data transmission delays of the TCP connection associated with the cellular network;

based on determining that the data transmission delay of the TCP connection associated with the cellular network is less than or equal to the data transmission delay of the TCP connection associated with the Wi-Fi network, establishing, by the terminal device, a first TCP connection to the application server through an interface of the cellular network; and after the first TCP connection is successfully established, establishing, by the terminal device, a second TCP connection to the application server through an interface of the Wi-Fi network.

14. The non-transitory computer-readable storage medium having processor-executable instructions stored thereon according to claim 13, wherein the processor-executable instructions, when executed, further facilitate:

determining, by using the historical data, a second weighted average value µ2' of the data transmission delay of the TCP connection associated with the cellular network, and the first average value µ1 and the standard deviation σ of the data transmission delay of the TCP connection associated with the Wi-Fi network; and based on µ2'≤µ1+2×σ, determining that the data transmission delay of the TCP connection associated with the cellular network is less than or equal to the data transmission delay of the TCP connection associated with the Wi-Fi network, or based on µ2'≤µ1+2×σ, determining that the data transmission delay of the TCP connection associated with the cellular network is greater than the data transmission delay of the TCP connection associated with the Wi-Fi network;

wherein $$\mu 1 = \frac{x_1 + x_2 + x_3 + x_1 + \ldots + x_N}{N}; \quad (4)$$

$$\sigma = \sqrt{\frac{1}{N}\sum_{i=1}^{N}(x_i - \mu 1)^2}; \text{ and} \quad (5)$$

$$\mu 2' = \frac{y_2 + \omega_2 + y_3 \times \omega_{22} + y_3 \times \omega_3 + \ldots + y_1 + \omega_1 + \ldots + y_M + \omega_M}{M}; \quad (6)$$

wherein $x_1$ to $x_N$ are the data transmission delays of the TCP connection associated with the Wi-Fi network, N is the quantity of data transmission delays of the TCP connection associated with the Wi-Fi network, $y_1$ to $y_M$ are the data transmission delays of the TCP connection associated with the cellular network, M is the quantity of data transmission delays of the TCP connection associated with the cellular network, and ω are weight values of the data transmission delays of the TCP connection associated with the cellular network, wherein a respective weight of a respective data transmission delay of the TCP connection associated with the cellular network with a relatively earlier establishment time is relatively lower than a respective data transmission delay of the TCP connection associated with the cellular network with a relatively later establishment time.

15. The non-transitory computer-readable storage medium having processor-executable instructions stored thereon according to claim 13, wherein the historical data further comprises an identifier of an application, an identifier of the cellular network, and an identifier of the Wi-Fi network; and wherein when the processor-executable instructions are executed, they further facilitate:

determining, from the historical data, a data transmission delay set of a target TCP connection whose identifier is the same as that of an application associated with the application server;

determining, from the data transmission delay set of the target TCP connection based on the identifier of the cellular network, a first data transmission delay whose identifier is the same as that of a current cellular network;

determining, from the data transmission delay set of the target TCP connection based on the identifier of the Wi-Fi network, a second data transmission delay whose identifier is the same as that of a current Wi-Fi network; and determining, based on the first data transmission delay and the second data transmission delay, that the data transmission delay of the TCP connection associated with the cellular network is less than or equal to the data transmission delay of the TCP connection associated with the Wi-Fi network.

16. The non-transitory computer-readable storage medium having processor-executable instructions stored thereon according to claim 13, wherein the cellular network is a Long Term Evolution (LTE) network.

17. The non-transitory computer-readable storage medium having processor-executable instructions stored thereon according to claim 13, wherein when the processor-executable instructions are executed, they further facilitate: storing data transmission delays of the first and second established TCP connections.

18. The non-transitory computer-readable storage medium having processor-executable instructions stored thereon according to claim 13, wherein when the processor-executable instructions are executed, they further facilitate:
  before establishing the first TCP connection to the application server through the interface of the cellular network, sending a packet to a base station in a cellular network accessed by the terminal device to activate the cellular network of the terminal device.

\* \* \* \* \*

UNITED STATES PATENT AND TRADEMARK OFFICE
CERTIFICATE OF CORRECTION

PATENT NO. : 11,997,736 B2
APPLICATION NO. : 17/418689
DATED : May 28, 2024
INVENTOR(S) : Wang et al.

Page 1 of 1

It is certified that error appears in the above-identified patent and that said Letters Patent is hereby corrected as shown below:

In the Claims

Claim 2, Column 27, Line 41, part of Equation (4): "$x_1 + x_2 + x_3 + x_1 + \cdots + x_N$" should read -- $x_1 + x_2 + x_3 + \cdots + x_1 + \cdots + x_N$ --.

Claim 2, Column 27, Line 46, part of Equation (6): "$y_2 \times \omega_2 + y_3 \times \omega_{22} + y_3 \times \omega_3 + \cdots + y_i + \omega_i + \cdots + y_M \times \omega_M$" should read -- $y_1 \times \omega_1 + y_2 \times \omega_{12} + y_3 \times \omega_3 + \cdots + y_i \times \omega_i + \cdots + y_M \times \omega_M$ --.

Claim 8, Column 29, Line 58, part of Equation (6): "$y_1 + y_2 + y_3 + \cdots + y_i + \cdots + y_M$" should read -- $y_1 \times \omega_1 + y_2 \times \omega_{12} + y_3 \times \omega_3 + \cdots + y_i \times \omega_i + \cdots + y_M \times \omega_M$ --.

Claim 14, Column 32, Line 4, part of Equation (4): "$x_1 + x_2 + x_3 + x_1 + \cdots + x_N$" should read -- $x_1 + x_2 + x_3 + \cdots + x_i + \cdots + x_N$ --.

Claim 14, Column 32, Line 9, part of Equation (6): ): "$y_2 \times \omega_2 + y_3 \times \omega_{22} + y_3 \times \omega_3 + \cdots + y_1 + \omega_1 + \cdots + y_M \times \omega_M$" should read -- $y_1 \times \omega_1 + y_2 \times \omega_{12} + y_3 \times \omega_3 + \cdots + y_i \times \omega_i + \cdots + y_M \times \omega_M$ --.

Claim 14, Column 32, Line 18: "associated with the cellular network, and to are weight" should read -- associated with the cellular network, and $\omega_1$ to $\omega_M$ are weight --.

Signed and Sealed this
Fifteenth Day of April, 2025

Coke Morgan Stewart
*Acting Director of the United States Patent and Trademark Office*